United States Patent
Miyabe et al.

(10) Patent No.: US 12,340,545 B2
(45) Date of Patent: Jun. 24, 2025

(54) INFORMATION PROCESSING WITH GENERATION OF IMAGE DATA USING EVENT DATA FROM AN INTEGRATION PERIOD THAT OVERLAPS WITH A PREVIOUS FRAME PERIOD

(71) Applicant: Sony Semiconductor Solutions Corporation, Kanagawa (JP)

(72) Inventors: Toshihiro Miyabe, Kanagawa (JP); Hirotaka Niikura, Tokyo (JP); Yoshitaka Miyatani, Tokyo (JP); Hideyuki Kawashima, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 119 days.

(21) Appl. No.: 18/247,557

(22) PCT Filed: Oct. 18, 2021

(86) PCT No.: PCT/JP2021/038387
§ 371 (c)(1),
(2) Date: Mar. 31, 2023

(87) PCT Pub. No.: WO2022/091834
PCT Pub. Date: May 5, 2022

(65) Prior Publication Data
US 2023/0319437 A1    Oct. 5, 2023

(30) Foreign Application Priority Data
Oct. 30, 2020  (JP) ................................. 2020-183080

(51) Int. Cl.
*H04N 5/335*   (2011.01)
*G06T 7/20*    (2017.01)
(Continued)

(52) U.S. Cl.
CPC ................ *G06V 10/60* (2022.01); *G06T 7/20* (2013.01); *H04N 25/47* (2023.01); *H04N 25/779* (2023.01); *H04N 25/78* (2023.01)

(58) Field of Classification Search
CPC ....................................... H04N 25/75
See application file for complete search history.

(56) References Cited

U.S. PATENT DOCUMENTS

| | | | |
|---|---|---|---|
| 10,198,660 B2 * | 2/2019 | Ji | ............................ G06V 10/10 |
| 2017/0213105 A1 * | 7/2017 | Ji | ............................ G06V 10/10 |
| 2022/0030185 A1 * | 1/2022 | Honda | .................... G06T 7/254 |

FOREIGN PATENT DOCUMENTS

| | | |
|---|---|---|
| JP | 2015028780 A | 2/2015 |
| WO | 2020067410 A1 | 4/2020 |
| WO | 2020195934 A1 | 10/2020 |

OTHER PUBLICATIONS

International Search Report (PCT/ISA/210), International Application No. PCT/JP2021/038387, dated Dec. 21, 2021.

* cited by examiner

*Primary Examiner* — Gary C Vieaux
(74) *Attorney, Agent, or Firm* — Michael Best & Friedrich LLP

(57) ABSTRACT

The present invention aims to suppress a decrease in the accuracy of inspection, recognition, and the like of an object. An information processing apparatus according to embodiments includes a processing unit (202) that generates image data on the basis of event data output from a first sensor (100) including a pixel array unit (101) in which multiple pixels (20) that each detect a luminance change of incident light and output event data are arranged in a two-dimensional lattice pattern. In the information processing apparatus, the processing unit generates first image data of a current frame by using event data detected during an inte-
(Continued)

gration period including an overlap period that overlaps with at least a part of a frame period of a previous frame.

17 Claims, 21 Drawing Sheets

(51) Int. Cl.
*G06V 10/60* (2022.01)
*H04N 25/47* (2023.01)
*H04N 25/779* (2023.01)
*H04N 25/78* (2023.01)

(a)　　　(b)

(a)　　　(b)

(a)   (b)

INFORMATION PROCESSING WITH GENERATION OF IMAGE DATA USING EVENT DATA FROM AN INTEGRATION PERIOD THAT OVERLAPS WITH A PREVIOUS FRAME PERIOD

FIELD

The present disclosure relates to an information processing apparatus and an electronic apparatus.

BACKGROUND

In a solid-state imaging device using a complementary metal oxide semiconductor (CMOS) or the like, an asynchronous solid-state imaging element that detects a luminance change for each pixel in real time as an event has been proposed. The solid-state imaging element that detects an event for each pixel as described above is also referred to as an event-based vision sensor (EVS) or a dynamic vision sensor (DVS).

In addition, for example, Patent Literature 1 discloses a technique for inspecting the speed and rotation of an object on the basis of an event detected by EVS.

CITATION LIST

Patent Literature

Patent Literature 1: JP 2015-28780 A

SUMMARY

Technical Problem

However, in a case where an inspection target object moves at a higher speed than expected, or in a situation where multiple targets are intermingled, the accuracy of inspection or recognition of an object based on an event detected by EVS may be lowered.

Against this background, the present disclosure proposes an information processing apparatus and an electronic apparatus capable of suppressing a decrease in accuracy of inspection, recognition, and the like of an object.

Solution to Problem

To solve the problems described above, an information processing apparatus according to an embodiment of the present disclosure includes a processing unit that generates image data on the basis of event data output from a first sensor including a pixel array unit in which a plurality of pixels that each detect a luminance change of incident light and output event data are arranged in a two-dimensional lattice pattern, wherein the processing unit generates first image data of a current frame by using event data detected during an integration period including an overlap period that overlaps with at least a part of a frame period of a previous frame.

DESCRIPTION OF EMBODIMENTS

Figure 1:
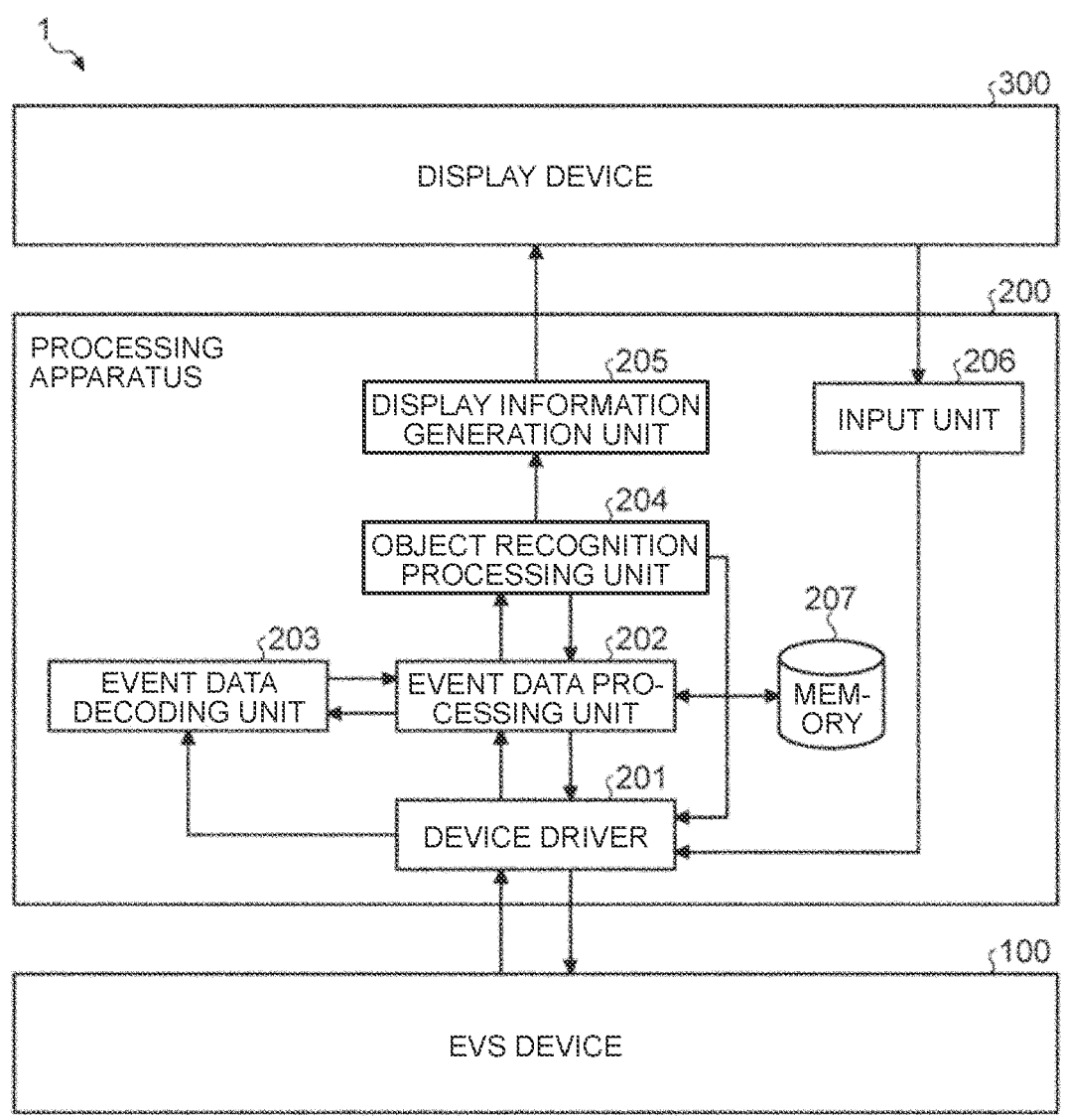
FIG. 1 is a schematic diagram illustrating a schematic configuration example of an electronic apparatus equipped with a solid-state imaging device according to a first embodiment.

Hereinafter, embodiments of the present disclosure will be described in detail with reference to the drawings. Note that, in the following embodiment, the same parts are denoted by the same reference signs to omit redundant description.

In addition, the present disclosure will be described according to the following item order.
1. First Embodiment
1.1 System configuration example
1.2 Schematic configuration example of processing apparatus
1.3 Schematic configuration example of EVS device
1.4 Exemplary circuit configuration of unit pixel
1.5 Schematic operation example
1.6 Basic operation example of frame data generation
1.7 Problem in processing
1.8 Operation example of frame data generation
1.8.1 First example (time-series overlap)
1.8.2 Second example (temporally variable overlap period)
1.8.3 Third example (overlap period variable for each area (part 1))
1.8.4 Fourth example (overlap period variable for each area (part 2))
1.9 Application example
1.9.1 Example of application to object tracking for high-speed moving object
1.9.2 Example of application to object tracking in case where trajectories of multiple objects intersect
1.9.3 Example of application to object tracking using Mean Shift method
1.10 Summary
2. Second Embodiment
2.1 System configuration example
2.2 Schematic configuration example of processing apparatus
2.3 Schematic operation example
2.3.1 First operation example
2.3.2 Second operation example
2.4 Summary
3. Hardware configuration

1. First Embodiment

First, an information processing apparatus and an electronic apparatus according to a first embodiment will be described in detail with reference to the drawings.

1.1 System Configuration Example

FIG. 1 is a schematic diagram illustrating a schematic configuration example of an electronic apparatus equipped with a solid-state imaging device according to the first embodiment. As illustrated in FIG. 1, an electronic apparatus 1 according to this embodiment includes an EVS device 100 as a solid-state imaging device, a processing apparatus 200, and a display device 300.

Although will be described in detail later, the EVS device 100 includes multiple pixels (also referred to as event pixels) arranged in a two-dimensional lattice pattern, and outputs event data including position information (address) for specifying a pixel in which the event has been detected and time information (time stamp) at which the event has been detected on the basis of a luminance change detected in each pixel. In addition, in a case where each pixel detects a luminance change in the positive direction and a luminance change in the negative direction as separate events (positive event and negative event), the event data may further include polarity information indicating the polarity (positive/negative) of the detected event.

The processing apparatus 200 is constituted of, for example, an information processing apparatus such as an application processor, and is configured to generate frame data (also simply referred to as image data) of an image from the input event information. The generated image data may be displayed on the display device 300 or may be transmitted to another external information processing apparatus (such as a cloud server).

Further, the processing apparatus 200 may execute predetermined processing such as object recognition on the generated image data, for example. The processing result generated by this processing may be displayed on the display device 300 or may be transmitted to another external information processing apparatus (such as a cloud server).

The display device 300 is constituted of a display, for example, and displays image data, a processing result, and the like input from the processing apparatus 200 to the user. Note that the display device 300 is not limited to a single display, and various displays such as a display mounted on a tablet terminal, a smartphone, a personal computer, and the like may be employed.

1.2 Schematic Configuration Example of Processing Apparatus

Here, a more detailed functional block configuration of the processing apparatus 200 will be described. As illustrated in FIG. 1, the processing apparatus 200 includes a device driver 201, an event data processing unit 202, an event data decoding unit 203, an object recognition processing unit 204, a display information generation unit 205, an input unit 206, and a memory 207.

(Device Driver 201)

The device driver 201 is a driver that drives the EVS device 100, and drives the EVS device 100 on the basis of held parameters. Further, the device driver 201 inputs the event data output from the EVS device 100 to the event data processing unit 202 (or the event data decoding unit 203).

(Event Data Processing Unit 202)

The event data processing unit 202 generates image data on the basis of the event data input from the device driver 201. However, the event data output from the EVS device 100 is described in a data format defined by the provider of the EVS device 100. In that case, the event data processing unit 202 may input the event data input from the device driver 201 to the event data decoding unit 203, and generate image data using the event data converted into a format that can be processed by the event data decoding unit 203.

(Event Data Decoding Unit 203)

As described above, the event data decoding unit 203 converts the event data output from the EVS device 100 into event data in a format that can be processed by the event data processing unit 202. Specifically, the event data decoding unit 203 decodes the event data in the provider-dependent data format to convert the data format of the event data into a data format that can be processed by a program such as a C language structural body. The event data decoding unit 203 as described above may be configured by software, or may be configured by an application specific integrated circuit (ASIC), a field-programmable gate array (FPGA), or the like. In addition, the device driver 201 may input the event data output from the EVS device 100 directly to the event data decoding unit 203 without via the event data processing unit 202.

The event data decoded by the event data decoding unit 203 may include the following information.
- x: X address of pixel in which an event is detected
- y: Y address of pixel in which an event is detected
- t: time information (time stamp) indicating the time at which an event has been detected
- p: polarity information indicating whether the luminance has changed to positive or negative (Object Recognition Processing Unit 204)

The object recognition processing unit 204 executes predetermined processing such as object recognition on the image data generated by the event data processing unit 202. The processing result thus generated is input to the display information generation unit 205 together with the image data to be processed, for example.

(Display Information Generation Unit 205)

The display information generation unit 205 is constituted of, for example, an information processing device such as a graphics processing unit (GPU), and generates an image to be presented to the user from the input image data and/or processing result. Further, in a case where the display device 300 includes an input device such as a touch panel, for example, the display information generation unit 205 may generate a user interface (UI) image that uses the input device.

(Input Unit 206)

The input unit 206 is, for example, an interface that receives operation information input by the user to the UI displayed on the display device 300. For example, by inputting the operation information according to the UI displayed on the display device 300, the user can input, for example, setting or adjustment of a threshold value at the time of detecting an event in the EVS device 100, setting or adjustment of an overlap period to be described later, and the like.

(Memory 207)

The memory 207 is a storage area constituted of, for example, a random access memory (RAM), a flash memory, or the like, and stores the event data output from the EVS device 100 and/or the event data decoded by the event data decoding unit 203.

Note that, at least one of the device driver 201, the event data processing unit 202, the event data decoding unit 203, the object recognition processing unit 204, the display information generation unit 205, the input unit 206, and the memory 207 may be arranged on the same chip as the EVS device 100. In other words, the EVS device 100 as the solid-state imaging device may include at least one of the device driver 201, the event data processing unit 202, the event data decoding unit 203, the object recognition processing unit 204, the display information generation unit 205, the input unit 206, and the memory 207.

1.3 Schematic Configuration Example of EVS Device

Figure 2:
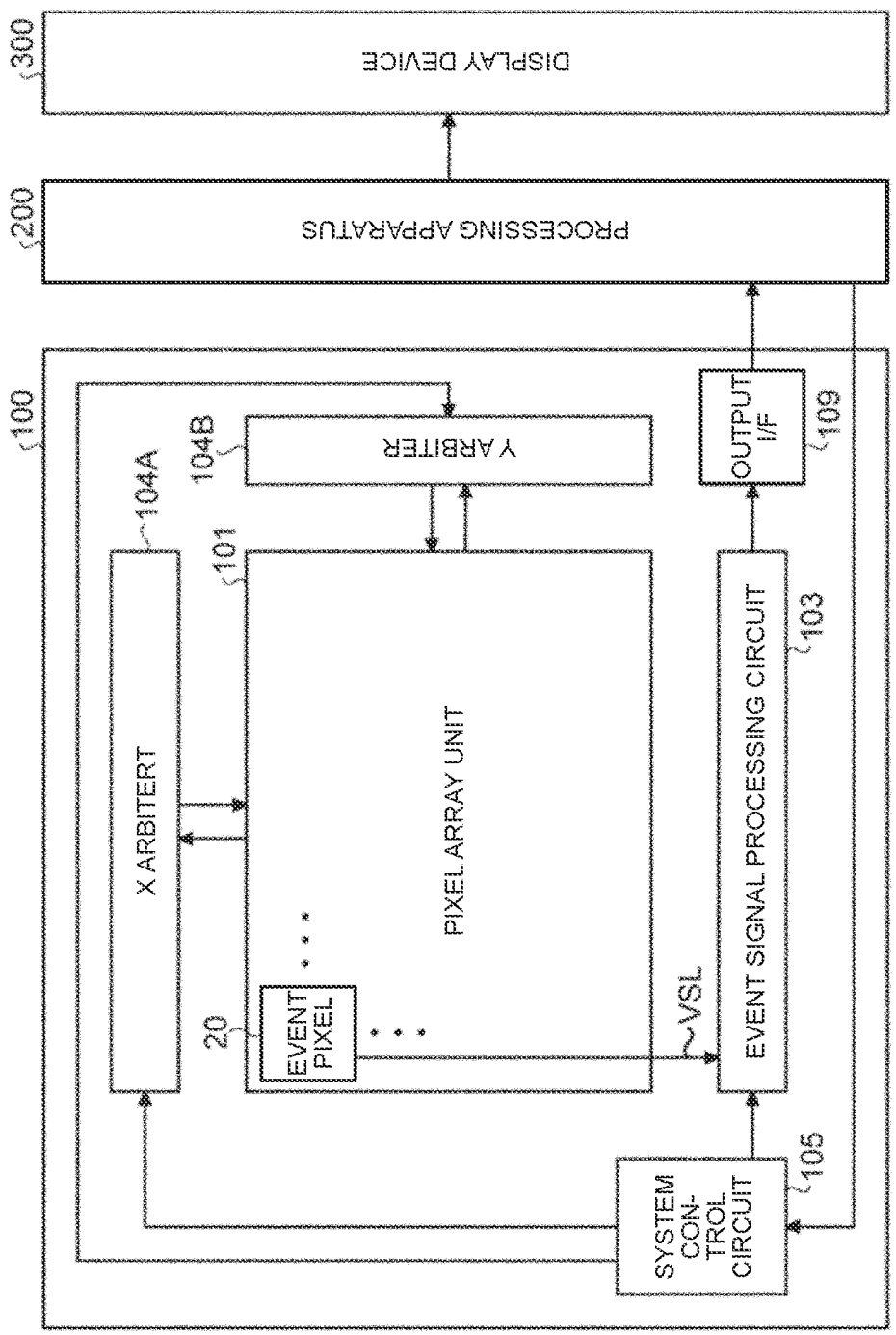
FIG. 2 is a block diagram illustrating a schematic configuration example of an EVS device according to the first embodiment.

Next, a schematic configuration example of the EVS device 100 will be described. FIG. 2 is a block diagram illustrating a schematic configuration example of the EVS device according to this embodiment. As illustrated in FIG. 2, the EVS device 100 includes a pixel array unit 101, an X arbiter 104A and a Y arbiter 104B, an event signal processing circuit 103, a system control circuit 105, and an output interface (I/F) 109.

The pixel array unit 101 has a configuration in which multiple event pixels 20 that each detect an event on the basis of a luminance change of incident light are arranged in a two-dimensional lattice pattern. Note that, in the following description, a row direction (also referred to as a row direction) refers to an arrangement direction of pixels in a pixel row (a lateral direction in the drawing), and a column direction (also referred to as a column direction) refers to an arrangement direction of pixels in a pixel column (a longitudinal direction in the drawing).

Each event pixel 20 includes a photoelectric conversion element that generates a charge according to the luminance of incident light. When detecting a luminance change of incident light on the basis of the photocurrent flowing out from the photoelectric conversion element, the event pixel outputs a request for requesting reading from itself to the X arbiter 104A and the Y arbiter 104B, and outputs event data indicating that an event has been detected according to arbitration by the X arbiter 104A and the Y arbiter 104B.

In the pixel array unit 101, a pixel drive line LD is arranged along the row direction for each pixel row, and a vertical signal line VSL is arranged along the column direction for each pixel column with respect to the matrix-like pixel array. The pixel drive line LD transmits a control signal for bringing the event pixel 20 into an active state in which the event pixel can detect an event. In FIG. 2, the pixel drive line LD is illustrated as one line, but the number of lines is not limited to one.

Each event pixel 20 detects whether an event exists on the basis of whether or not a change exceeding a predetermined threshold has occurred in the photocurrent according to the luminance of incident light. For example, each event pixel 20 detects, as an event, that a luminance change has exceeded a predetermined threshold value (positive event) or fallen below the predetermined threshold value (negative event).

When detecting an event, the event pixel 20 outputs a request for requesting permission to output event data indicating the occurrence of the event to each of the X arbiter 104A and the Y arbiter 104B. Then, the event pixel 20 outputs the event data to the event signal processing circuit 103 when receiving a response indicating permission to output the event data from each of the X arbiter 104A and the Y arbiter 104B.

The X arbiter 104A and the Y arbiter 104B arbitrate the request for requesting output of the event data supplied from each of the multiple event pixels 20, and transmit a response based on the arbitration result (permission/non-permission of the output of the event data) and a reset signal for resetting the event detection to the event pixel 20 that has output the request.

The event signal processing circuit 103 performs predetermined signal processing on the event data input from the event pixel 20, and outputs event data subjected to signal processing.

As described above, the change in the photocurrent generated in the event pixel 20 can also be regarded as a change in the amount of light (luminance change) of light incident on the photoelectric conversion unit of the event pixel 20. Therefore, it can also be said that the event is a change in the amount of light (luminance change) of the event pixel 20 exceeding the predetermined threshold. The event data indicating the occurrence of the event includes at least position information such as coordinates indicating the position of the event pixel 20 where the change in the amount of light as the event has occurred. The event data can include the polarity of the change in the amount of light in addition to the position information.

For a series of event data output at the timing when an event occurs from the event pixel 20, as long as the interval between the pieces of event data is maintained as it is at the time when the event occurs, it can be said that the event data implicitly includes time information indicating the relative time when the event occurs.

However, when the interval between the pieces of event data is not maintained as it is at the time when the event occurs due to the event data being stored in the memory or the like, the time information implicitly included in the event data is lost. Therefore, before the interval between the pieces of event data is not maintained as it is at the time when the event occurs, the event signal processing circuit 103 may include, in the event data, time information such as a time stamp indicating the relative time at which the event has occurred.

(Other Configurations)

The system control circuit 105 is constituted of a timing generator that generates various timing signals and the like, and performs drive control of the X arbiter 104A, the Y arbiter 104B, the event signal processing circuit 103, and the like on the basis of various timings generated by the timing generator.

The output I/F 109 sequentially outputs, to the processing apparatus 200, the event data output in units of rows from the event signal processing circuit 103.

1.4 Exemplary Circuit Configuration of Unit Pixel

Figure 3:
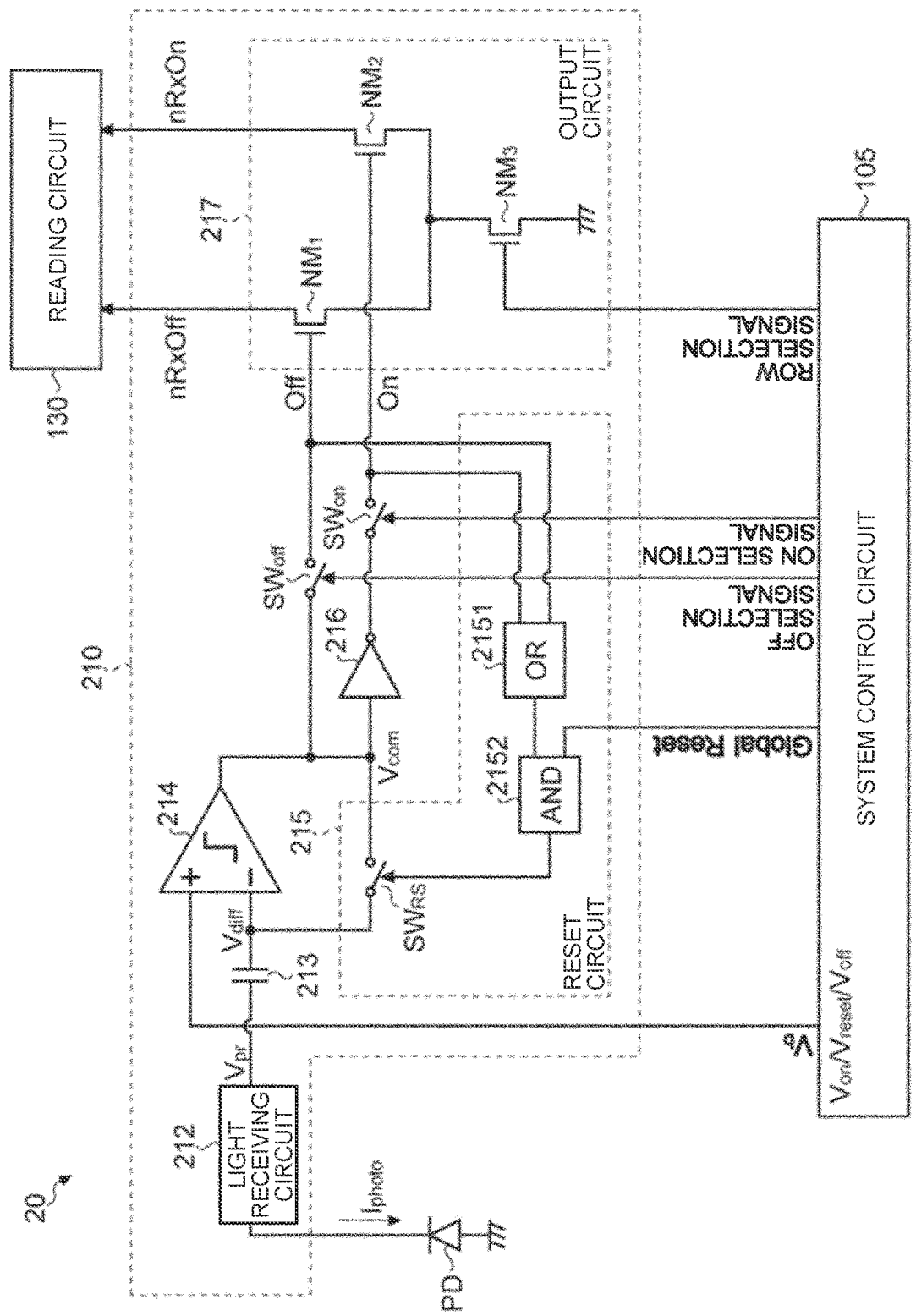
FIG. 3 is a circuit diagram illustrating a schematic configuration example of an event pixel according to the first embodiment.

Next, a circuit configuration example of the event pixel 20 will be described. FIG. 3 is a circuit diagram illustrating a schematic configuration example of the event pixel according to the first embodiment. Note that, FIG. 3 illustrates a configuration example in a case where one comparator performs detection of a positive event and detection of a negative event in a time division manner.

Here, the event can include, for example, a positive event indicating that the amount of change of the photocurrent exceeds the upper limit threshold value and a negative event indicating that the amount of change falls below the lower limit threshold value. In this case, the event data indicating the occurrence of the event can include, for example, one bit indicating the occurrence of the event and one bit indicating the polarity of the event having occurred. Note that, the event pixel 20 may have a function of detecting only the positive event or a function of detecting only the negative event.

As illustrated in FIG. 3, the event pixel 20 includes, for example, a photoelectric conversion unit PD and an address event detection circuit 210. The photoelectric conversion unit PD is constituted of a photodiode or the like, for example, and causes a charge generated by photoelectrically converting incident light to flow out as a photocurrent $I_{photo}$. The photocurrent $I_{photo}$ having flowed out flows into the address event detection circuit 210.

The address event detection circuit 210 includes a light receiving circuit 212, a memory capacitor 213, a comparator 214, a reset circuit 215, an inverter 216, and an output circuit 217.

The light receiving circuit 212 is constituted of a current-voltage conversion circuit, for example, and converts the photocurrent $I_{photo}$ having flowed out of the photoelectric conversion unit PD into a voltage $V_{pr}$. Here, the relationship between the voltage $V_{pr}$ and the intensity (luminance) of light is usually a logarithmic relationship. That is, the light receiving circuit 212 converts the photocurrent $I_{photo}$ corresponding to the intensity of light applied to the light receiving surface of the photoelectric conversion unit PD into the voltage $V_{pr}$ that is a logarithmic function. However, the relationship between the photocurrent $I_{photo}$ and the voltage $V_{pr}$ is not limited to the logarithmic relationship.

The voltage $V_{pr}$ according to the photocurrent $I_{photo}$ output from the light receiving circuit 212 passes through the memory capacitor 213 to become an inversion (−) input which is a first input of the comparator 214 as a voltage $V_{diff}$. The comparator 214 is usually constituted of a differential pair transistor. The comparator 214 uses a threshold voltage $V_b$ provided from the system control circuit 105 as a non-inverting (+) input which is a second input, and detects a positive event and a negative event in a time division manner. Furthermore, after the detection of the positive event/negative event, the event pixel 20 is reset by the reset circuit 215.

The system control circuit 105 outputs, as the threshold voltage $V_b$, a voltage $V_{on}$ at a stage of detecting a positive event, outputs a voltage $V_{off}$ at a stage of detecting a negative event, and outputs a voltage $V_{reset}$ at a stage of resetting in a time division manner. The voltage $V_{reset}$ is set to a value between the voltage $V_{on}$ and the voltage $V_{off}$, preferably a middle value between the voltage $V_{on}$ and the voltage $V_{off}$. Here, the "middle value" includes not only a case where the value is strictly a middle value but also a case where the value is substantially a middle value, and allows various variations caused by design or manufacturing.

Further, the system control circuit 105 outputs an ON selection signal to the event pixel 20 at a stage of detecting a positive event, outputs an OFF selection signal at a stage of detecting a negative event, and outputs a global reset signal (Global Reset) at a stage of resetting. The ON selection signal is provided as a control signal to a selection switch $SW_{on}$ provided between the inverter 216 and the output circuit 217. The OFF selection signal is provided as a control signal to a selection switch $SW_{off}$ provided between the comparator 214 and the output circuit 217.

In a stage of detecting a positive event, the comparator 214 compares the voltage $V_{on}$ with the voltage $V_{diff}$ and when the voltage $V_{diff}$ exceeds the voltage $V_{on}$, outputs positive event information On indicating that the amount of change of the photocurrent $I_{photo}$ has exceeded the upper limit threshold as a comparison result. The positive event information On is inverted by the inverter 216 and then supplied to the output circuit 217 through the selection switch $SW_{on}$.

In a stage of detecting a negative event, the comparator 214 compares the voltage $V_{off}$ with the voltage $V_{diff}$ and when the voltage $V_{diff}$ falls below the voltage $V_{off}$, outputs negative event information Off indicating that the amount of change of the photocurrent $I_{photo}$ has fallen below the lower limit threshold as a comparison result. The negative event information Off is supplied to the output circuit 217 through the selection switch $SW_{off}$.

The reset circuit 215 has a configuration including a reset switch $SW_{RS}$, a 2-input OR circuit 2151, and a 2-input AND circuit 2152. The reset switch $SW_{RS}$ is connected between the inverting (−) input terminal and the output terminal of the comparator 214, and is turned on (closed) to selectively short-circuit the connection between the inverting input terminal and the output terminal.

The OR circuit 2151 receives two inputs of the positive event information On transmitted via the selection switch $SW_{on}$ and the negative event information Off transmitted via the selection switch $SW_{off}$. The AND circuit 2152 uses an output signal of the OR circuit 2151 as one input and uses the global reset signal provided from the system control circuit 105 as the other input, and turns on (closes) the reset switch $SW_{RS}$ when either the positive event information On or the negative event information Off is detected and the global reset signal is in the active state.

As described above, in response to an event where the output signal of the AND circuit 2152 enters the active state, the reset switch $SW_{RS}$ short-circuits the connection between the inverting input terminal and the output terminal of the comparator 214 to perform global reset on the event pixel 20. As a result, the reset operation is performed only for the event pixel 20 in which the event has been detected.

The output circuit 217 has a configuration including a negative event output transistor $NM_1$, a positive event output transistor $NM_2$, and a current source transistor $NM_3$. The negative event output transistor $NM_1$ has a memory (not illustrated) for holding the negative event information Off at its gate portion. This memory is constituted of a gate parasitic capacitor of the negative event output transistor $NM_1$.

As with the negative event output transistor $NM_1$, the positive event output transistor $NM_2$ has a memory (not illustrated) for holding the positive event information On at its gate portion. This memory is constituted of a gate parasitic capacitor of the positive event output transistor $NM_2$.

In a reading stage, the negative event information Off held in the memory of the negative event output transistor $NM_1$ and the positive event information On held in the memory of the positive event output transistor $NM_2$ are transferred to a reading circuit 130 through an output line nRxOff and an output line nRxOn for each pixel row of the pixel array unit 101 by a row selection signal provided from the system control circuit 105 to a gate electrode of the current source transistor $NM_3$. The reading circuit 130 is, for example, a circuit provided in the event signal processing circuit 103 (see FIG. 3).

As described above, the event pixel 20 according to the circuit configuration example 1 has a configuration including an event detection function of detecting a positive event and a negative event in a time division manner under control of the system control circuit 105 using one comparator 214.

1.5 Schematic Operation Example

Next, a schematic operation example of the electronic apparatus according to this embodiment will be described with reference to a flowchart illustrated in FIG. 4. Note that, although this embodiment exemplifies a case where the electronic apparatus operates as the image recognition system, the present invention is not limited to this, and the technique according to this embodiment is applicable to a system that executes some processing on the basis of event data input from the EVS device 100.

Figure 4:
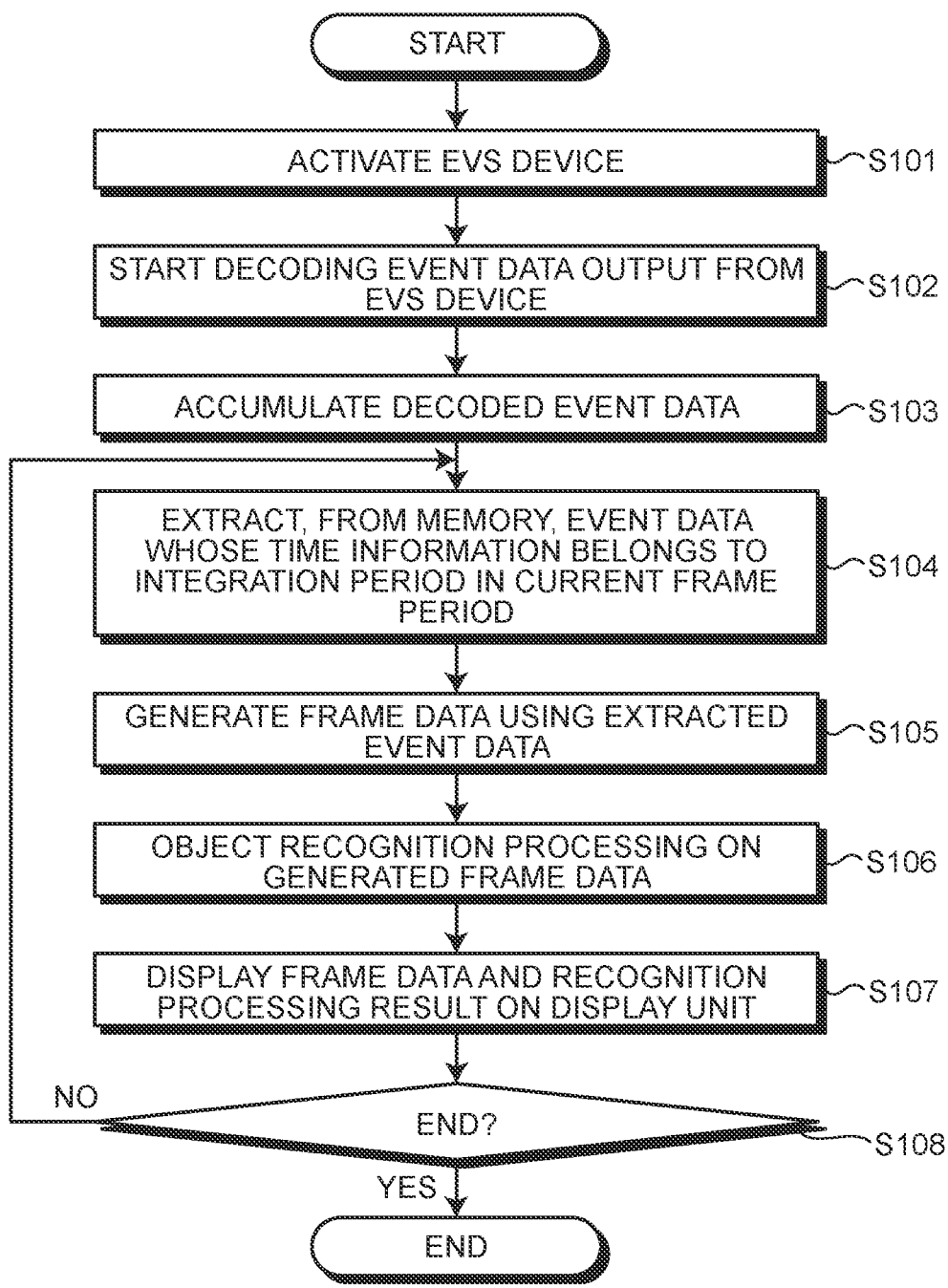
FIG. 4 is a flowchart illustrating a schematic operation example of the electronic apparatus according to the first embodiment.

FIG. 4 is a flowchart illustrating a schematic operation example of the electronic apparatus according to this embodiment. As illustrated in FIG. 4, in this operation, first, the EVS device 100 is activated (Step S101). This initiates the output of event data from the EVS device 100. The event data output from the EVS device 100 is sequentially input to the event data decoding unit 203 via the device driver 201 and the event data processing unit 202 (or the device driver 201) of the processing apparatus 200.

Next, the event data decoding unit 203 of the processing apparatus 200 starts decoding the input event data (Step S102). The decoded event data is accumulated in the memory 207 via the event data processing unit 202, for example (Step S103).

Next, the event data processing unit 202 extracts, from the event data accumulated in the memory 207, event data whose time information belongs to the integration period within the current frame period (Step S104), and generates frame data using the event data thus extracted (Step S105). The generated frame data is input to the object recognition processing unit 204.

Next, the object recognition processing unit 204 executes predetermined processing such as recognition processing and tracking on the input frame data, for example (Step S106). Note that, the recognition processing executed by the object recognition processing unit 204 is not particularly limited, and for example, various methods such as pattern matching, the Mean Shift method, and machine learning may be used.

The processing result by the object recognition processing unit 204 is input to the display device 300 together with the frame data, for example, and is displayed on the display device 300 to the user (Step S107).

Thereafter, it is determined whether or not to end this operation (Step S108), and in a case of ending this operation (YES in Step S108), this operation is ended. On the other hand, in a case of not ending this operation (NO in Step S108), this operation returns to Step S104, and the subsequent operations are executed.

1.6 Basic Operation Example of Frame Data Generation

Figure 5:
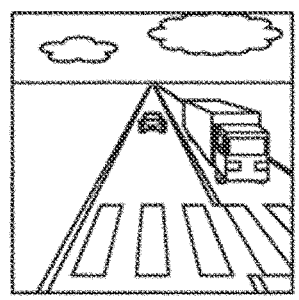
FIG. 5 is a diagram illustrating an example of image data of a certain scene.

Next, a basic operation at the time of generating the frame data illustrated in Steps S104 to S105 of FIG. 4 will be described. FIG. 5 is a diagram illustrating an example of image data of a certain scene, and FIG. 6 is a diagram illustrating an operation example of generating frame data (also referred to as difference data) in a certain scene.

Figure 6:
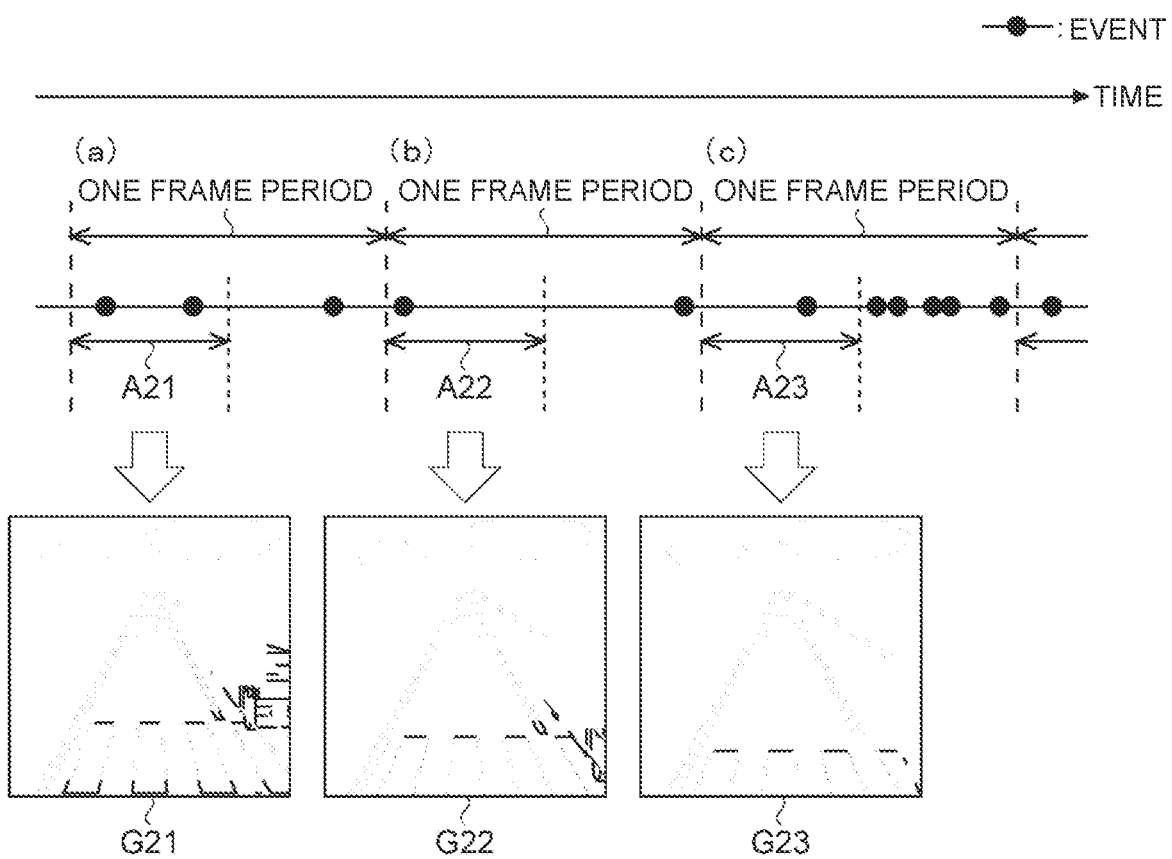
FIG. 6 is a diagram illustrating an operation example of generating frame data in a certain scene.

In a scene where the vehicle is traveling on a road as illustrated in FIG. 5, for example, as illustrated in FIG. 6, event data is output from the EVS device 100 each time a luminance change is detected in each pixel. Therefore, the event data is output from the EVS device 100 at any timing without depending on the frame period.

The event data processing unit 202 of the processing apparatus 200 manages the frame period using, for example, a timer (not illustrated) or the like. Therefore, the event data processing unit 202 can specify, from the event data accumulated in the memory 207, event data whose time information belongs to a certain frame period, in other words, event data of an event detected in the certain frame period.

However, in a case where it is not necessary to use all the event data detected during the frame period, it is also possible to generate frame data using the event data detected during a part of each frame period. That is, in this embodiment, it is possible to adjust a detection period (hereinafter, also referred to as an integration period) of valid event data in each frame period. This means that not only the integration period can be made shorter than one frame period, but also the integration period can be made longer than one frame period.

Therefore, for example, as illustrated in FIG. 6, in a case where the first half (previous 50%) of each frame period is set as the integration period, frame data of each frame period is generated using event data in which the time information belongs to the integration period. For example, in the frame period illustrated in (a) of FIG. 6, frame data G21 is generated using event data whose time information belongs to an integration period A21, in the frame period illustrated in (b), frame data G22 is generated using event data whose time information belongs to an integration period A22, and in the frame period illustrated in (c), frame data G23 is generated using event data whose time information belongs to an integration period A23.

Figure 7:
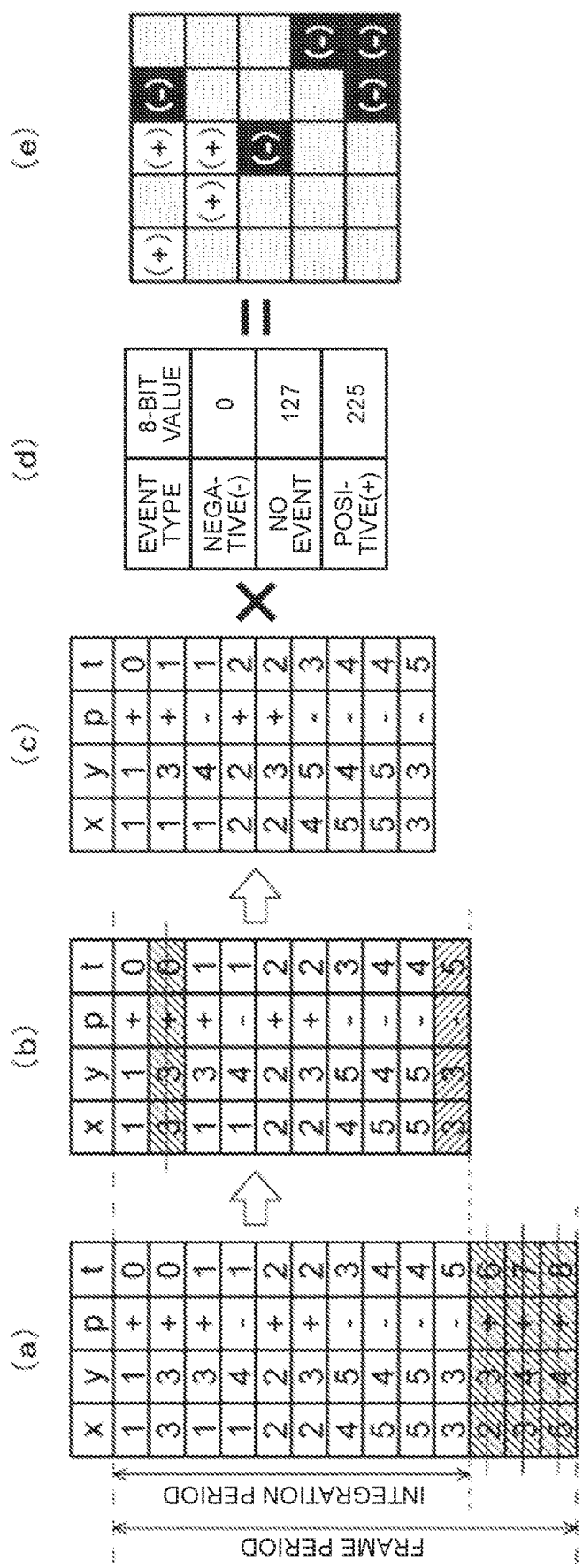
FIG. 7 is a schematic diagram illustrating a generation procedure of frame data in each frame period according to the first embodiment.

Next, an example of a generation procedure of frame data in each frame period will be described. FIG. 7 is a schematic diagram illustrating a generation procedure of frame data in each frame period according to this embodiment. Note that, the example illustrated in FIG. 7 illustrates a case where the pixel array unit 101 of the EVS device 100 is constituted of 5×5 pixels, one frame period is 8 ms (milliseconds), and the integration period is 5 ms from the beginning of the frame period. Further, in FIG. 7, 'x' indicates the X address of the pixel where the event has been detected, 'y' indicates the Y address of the pixel where the event has been detected, 'p' indicates the polarity (positive (+)/negative (−)) of the detected event, and 't' indicates time information (time stamp) indicating the time when the event has been detected.

In FIG. 7, (a) illustrates an example of event data input in one frame period, (b) illustrates an example of event data extracted for frame data generation from the event data illustrated in (a), (c) illustrates an example of frame data actually used for frame data generation in the extracted event data illustrated in (b), (d) illustrates an example of a conversion table used when the event data is converted into 8-bit grayscale values, and (e) illustrates an example of frame data generated by converting the event data illustrated in (c) using the conversion table illustrated in (d).

As illustrated in (a) to (b) of FIG. 7, in the generation of frame data, event data whose time information belongs to the integration period is extracted from the event data input in a certain frame period. In that case, among the event data illustrated in (a), hatched records of the event data are not extracted.

In addition, as illustrated in (b) to (c) of FIG. 7, among the extracted event data, the event data for the same pixel is updated with the latest event data, that is, updated with event data having later time information. In the example illustrated in (b), since the event data is duplicated for the pixel with the position information (x, y)=(3, 3), as illustrated in (c), the event data ((x, y, t)=(3,3,0)) having early time information is updated with the event data ((x, y, t)=(3,3,5)) having later time information.

The event data extracted as illustrated in (c) of FIG. 7 is converted into 8-bit grayscale pixels using the conversion table illustrated in (d) on the basis of its polarity. In the example illustrated in FIG. 7, event data with a positive polarity (+) is converted into a bit value '255', that is, a white pixel, event data with a negative polarity (−) is converted into a bit value '0', that is, a black pixel, and a pixel in which no event is detected is converted into an intermediate bit value '127', that is, a gray pixel. As a result, gray-scaled frame data as illustrated in (e) is generated.

1.7 Problem in Processing

In the processing for the frame data generated as described above, there is a possibility that the accuracy is reduced in a case where an object moves at a higher speed than expected, a situation where multiple objects are intermingled, or the like.

Consider an example of a device that sprays droplets from a dispenser to perform coating or the like. Such a device can contribute to improvement of the performance of the dispenser and the like by detecting the state of spraying droplets by object tracking or the like of the droplets, and performing appropriate feedback such as adjustment of the amount of droplets.

In such a device, in a case where the speed of spraying droplets is very high, for example, it may be difficult to capture an image even if a high-speed camera of about 1000 frames per second (FPS) is used. In such a case, it is possible to observe the state of spraying droplets by using an EVS which is an element characterized by high-speed processing.

However, even in the case of using an EVS, in a case where there are droplets having a speed higher than an assumed speed, or in a situation where multiple droplets are intermingled, the droplets may not be able to be detected or recognized by object tracking.

For example, in a method of performing processing in time series only in a range crossing two boundaries based on an area detected by object tracking as a search target, if the speed of the droplets is faster than that assumed, the droplets move beyond the boundaries, and thus the droplets may be lost.

Therefore, in this embodiment, when frame data is generated (also referred to as reconstructed) using the event data output from the EVS device 100, some data is caused to overlap between frames. By causing some data to overlap between frames, for example, it is possible to obtain an advantage that the accuracy of object tracking can be improved in an algorithm such as pattern matching or a Mean Shift method in which objects are more easily detected when the objects overlap in preceding and subsequent frames. This makes it possible to suppress a decrease in the accuracy of inspection, recognition, and the like of an object.

1.8 Operation Example of Frame Data Generation

Next, an operation of frame data generation according to this embodiment will be described with some examples.

1.8.1 First Example (Time-Series Overlap)

Figure 8:
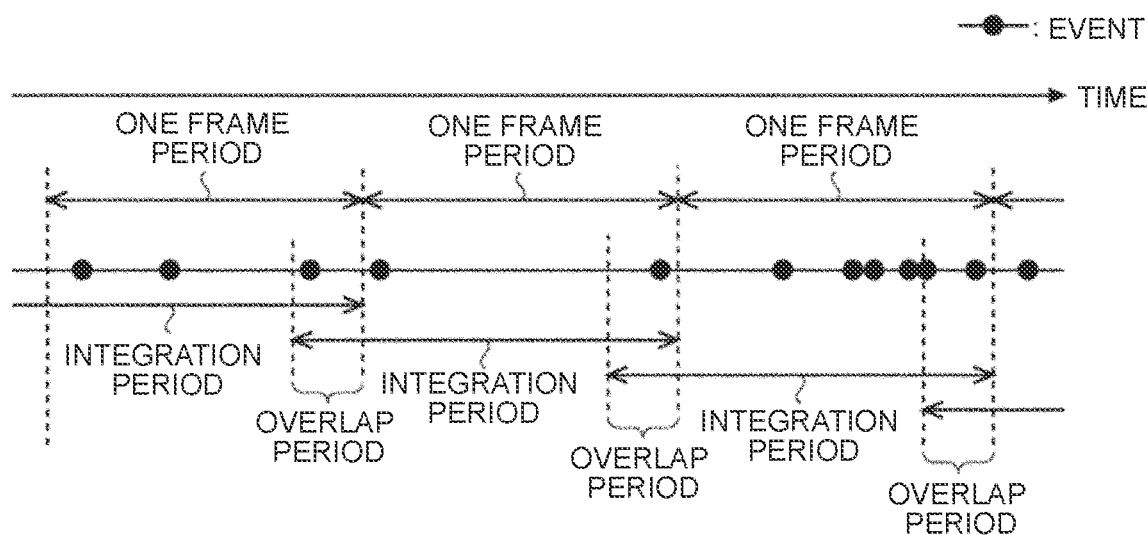
FIG. 8 is a diagram illustrating an operation example of generating frame data according to a first example of the first embodiment.

FIG. 8 is a diagram illustrating an operation example of generating frame data according to a first example of this embodiment. As illustrated in FIG. 8, in the first example, a part of the integration period in each frame period overlaps with the integration period in the previous frame period. In this way, by providing an overlap period in which the integration period overlaps between the preceding and subsequent frame periods, it is possible to spread the image of the object in the reconstructed frame data along the movement trajectory, and thus possible to suppress a decrease in processing accuracy due to loss of the object in object tracking, for example.

Note that, in a case where the integration periods are made to overlap with each other in the preceding and subsequent frame periods as described above, the memory 207 preferably has a memory capacity enough to store, for example, expected event data of two or more frames.

1.8.2 Second Example (Temporally Variable Overlap Period)

Figure 9:
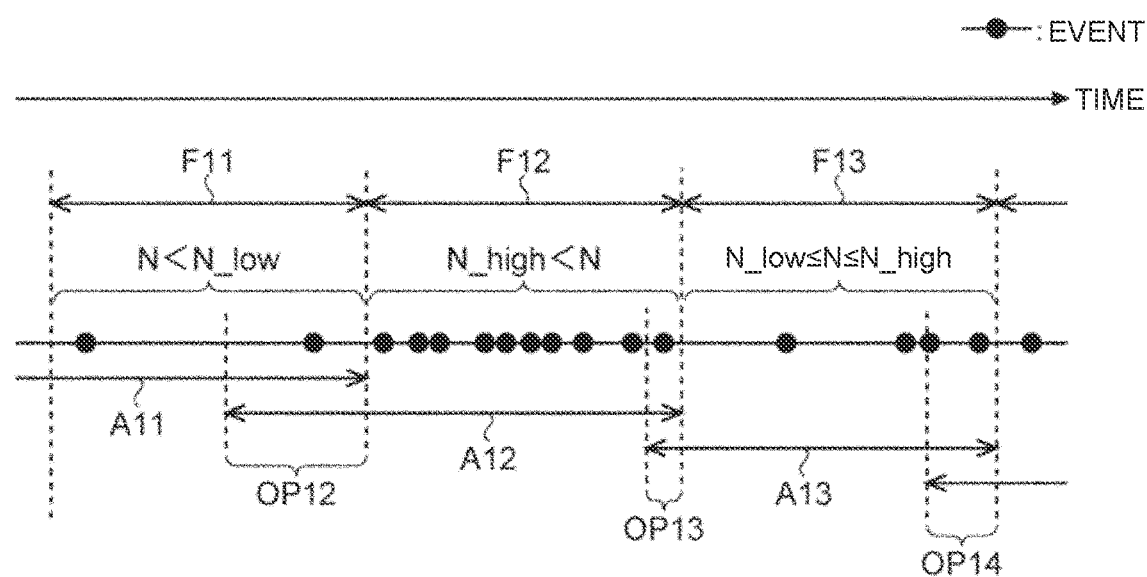
FIG. 9 is a diagram illustrating an operation example of generating frame data according to a second example of the first embodiment.

FIG. 9 is a diagram illustrating an operation example of generating frame data according to a second example of this embodiment. In the second example, a modification of the frame data generation operation described in the first example, in which the overlap period is variable, will be described.

As illustrated in FIG. 9, in the second example, the length of the overlap period to be applied to the integration period of the next frame period is adjusted on the basis of the number of events (the number of events N) detected in the previous frame period.

For example, as illustrated in FIG. 9, in a case where the number of events N in the previous frame period F11 is smaller than a preset lower limit threshold N_low, an overlap period OP12 applied to an integration period A12 of the next frame period F12 is set longer than the reference overlap period (for example, an overlap period OP14). On the other hand, in a case where the number of events N in the previous frame period F12 is larger than a preset upper limit threshold N_high, an overlap period OP13 applied to an integration period A13 of the next frame period F13 is set shorter than the reference overlap period (for example, the overlap period OP14).

Next, an operation example of generating frame data according to the second example will be described with reference to a flowchart illustrated in FIG. 10. Note that, in this description, for the same operation as the operation illustrated in FIG. 4, redundant description will be omitted by citing this operation.

Figure 10:
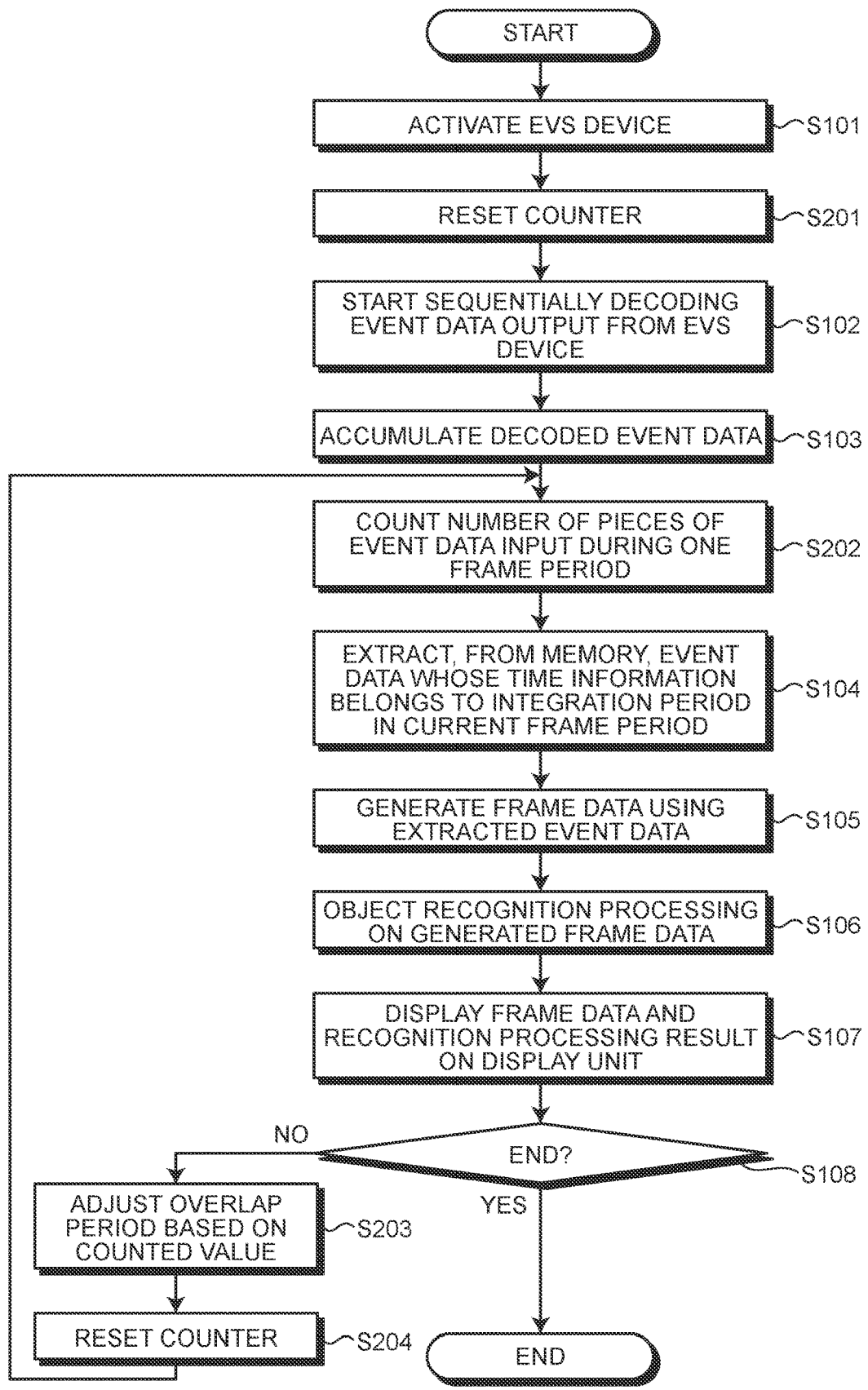
FIG. 10 is a flowchart illustrating a schematic operation example of the electronic apparatus according to the second example of the first embodiment.

As illustrated in FIG. 10, in this operation, first, when the EVS device 100 is activated (Step S101), the processing apparatus 200 resets the counter value of the counter managed in the event data processing unit 202, for example (Step S201). Subsequently, decoding of event data input from the EVS device 100 is started (Step S102), and the decoded event data is sequentially accumulated in the memory 207 (Step S103).

In addition, the event data processing unit 202 counts, by using the counter, the number of pieces of event data (the number of events N) input during one frame period, that is, input after reset of the counter (Step S202).

Thereafter, as in Steps S104 to S108 in FIG. 4, the object recognition processing is executed on the frame data generated based on the event data input during the integration period, the recognition processing result is displayed on the display device 300 together with the frame data, and then it is determined whether or not to end this operation.

If it is determined in Step S108 not to end this operation (NO in Step S108), the event data processing unit 202 adjusts the overlap period to be applied to the integration period of the next frame period based on the counter value of the counter (Step S203), and resets the counter (Step S204). For example, in a case where the number of events N indicated by the counter value is smaller than the preset lower limit threshold value N_low, the event data processing unit 202 adjusts the overlap period to be applied to the integration period of the next frame period to be long, and in a case where the number of events N indicated by the counter value is larger than the preset upper limit threshold value N_high, the event data processing unit adjusts the overlap period to be applied to the integration period of the next frame period to be short. Thereafter, this operation returns to Step S202.

As described above, by adjusting the length of the overlap period to be applied to the integration period of the next frame period on the basis of the number of events N detected in the previous frame period, the number of events constituting each piece of frame data can be smoothed. Therefore, in addition to the effects according to the first example, effects such as improvement in recognition accuracy in recognition processing and improvement in visibility at the time of presenting the data to the user can be obtained.

1.8.3 Third Example (Overlap Period Variable for Each Area (Part 1))

Figure 11:
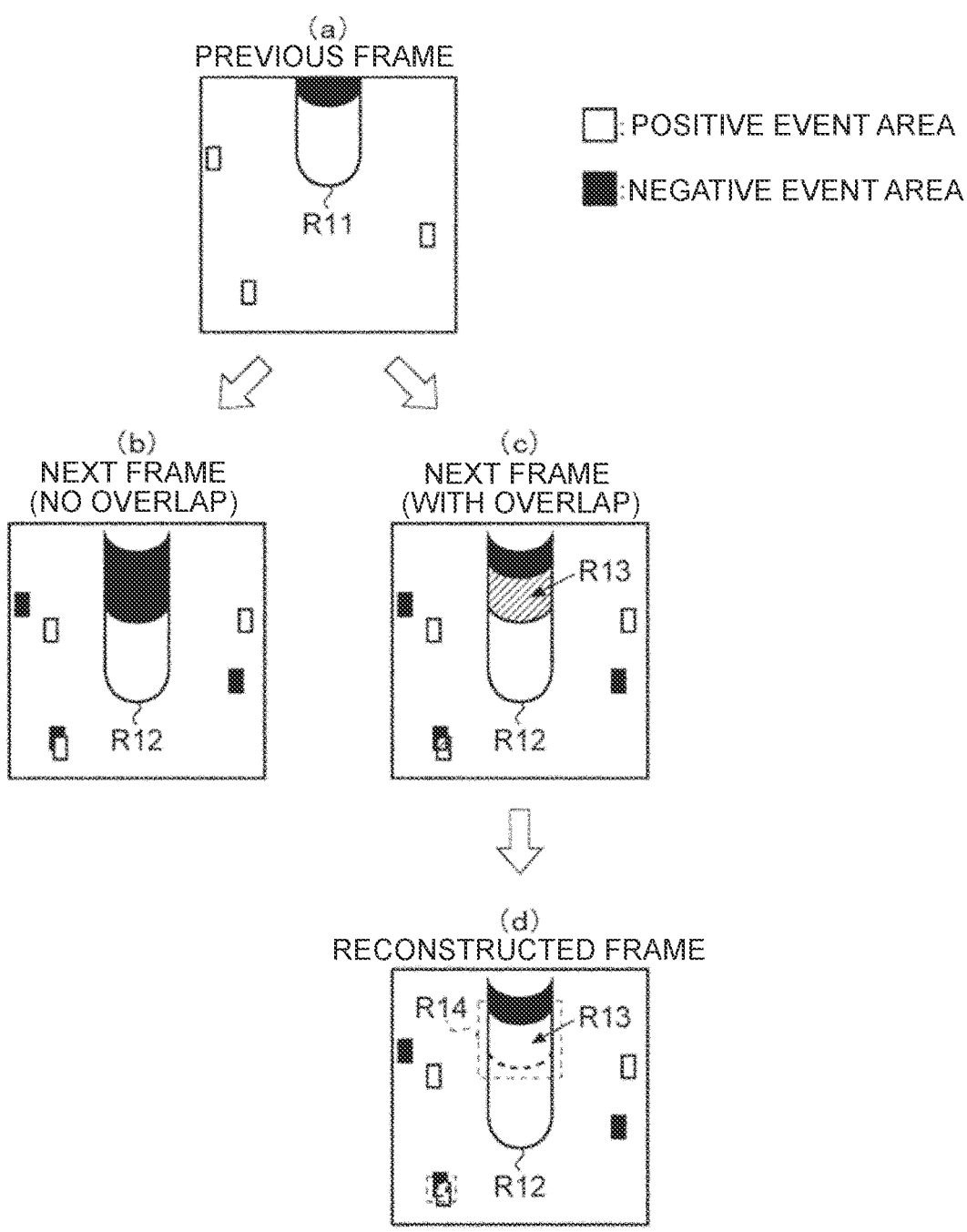
FIG. 11 is a schematic diagram illustrating an operation example of generating frame data according to a third example of the first embodiment.
Figure 12:
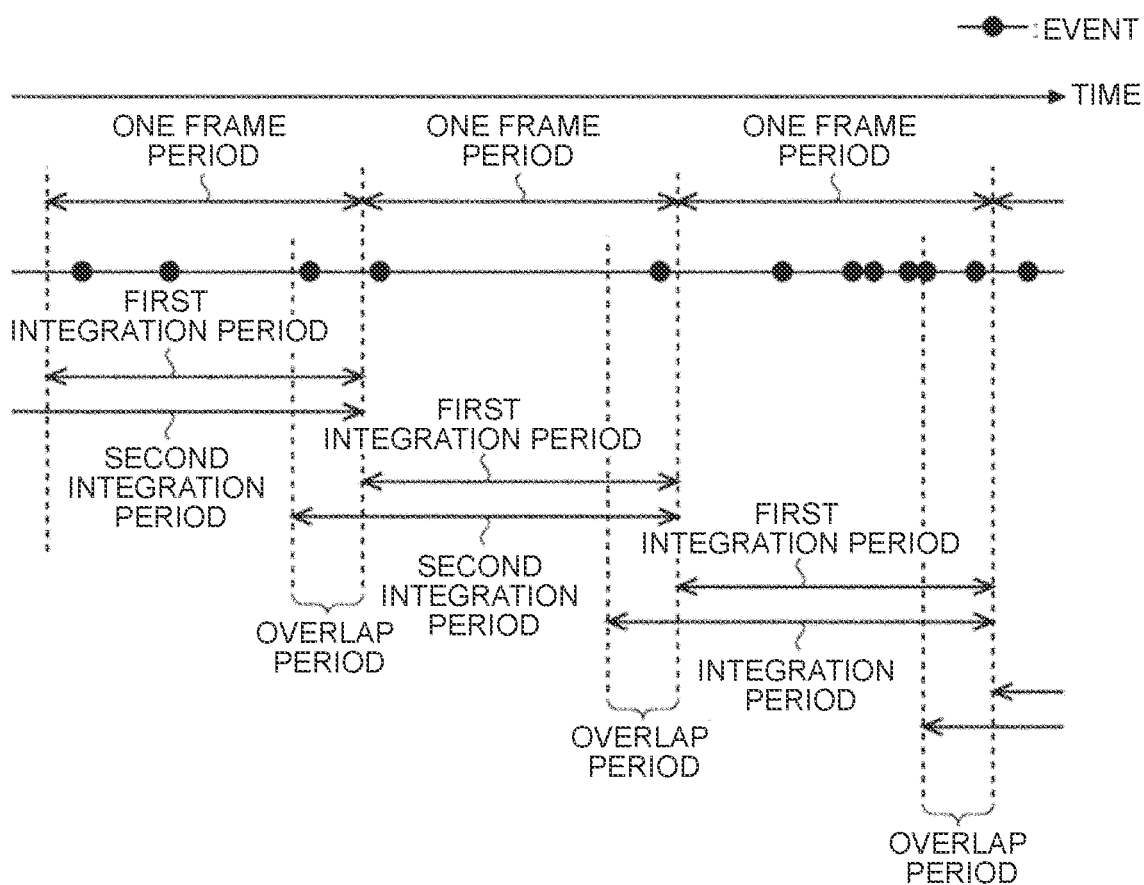
FIG. 12 is a diagram illustrating an operation example of generating frame data according to the third example of the first embodiment.

FIG. 11 is a schematic diagram illustrating an operation example of generating frame data according to a third example of this embodiment. FIG. 12 is a diagram illustrating an operation example of generating frame data according to the third example of this embodiment. In the third example, an example in which the overlap period is variable for each area, and an example in which the overlap period for each area is set on the basis of the event occurrence frequency or the like will be described.

In FIG. 11, (a) illustrates an example of frame data showing falling droplets reconstructed in the previous frame, (b) illustrates frame data reconstructed in the next frame in a case where no overlap between frames is performed, (c) illustrates an area where multiple events occur in the next frame in a case where overlap between frames is performed (this embodiment), and (d) illustrates frame data reconstructed in the next frame in a case where overlap between frames is performed (this embodiment).

As illustrated in (a) to (b) of FIG. 11, in a case where no overlap between frames is performed, that is, in a case where an overlap period is not applied to the integration period of the next frame period, an image R12 of a droplet indicated in frame data reconstructed in the next frame is an image of the droplet itself. In this case, when the droplet moves at a speed faster than expected, a problem such as loss of the droplet may occur in object tracking or the like.

On the other hand, as illustrated in (a) to (c) of FIG. 11, in the case of overlap between frames, an image R1*l* of a droplet exists in the overlap period, and multiple events including a positive event and a negative event are detected in an area R13 where the image R12 of the droplet does not exist in the integration period after the overlap period elapses.

Therefore, in the third example, as illustrated in (d) of FIG. 11, the image is reconstructed by overlap between frames for the area R13 in which the multiple events are detected, and the image is reconstructed without overlap between frames for the other areas, thus generating frame data of the next frame. In this case, as illustrated in FIG. 12, for example, a first integration period equivalent to the frame period is set for the area where no overlap between frames is performed, and a second integration period in which the overlap period is applied to the first integration period is set for the area R13 where overlap between frames is performed. Note that, the area where the image is reconstructed by overlap between frames may be an area R14 including the area R13 and its peripheral area.

For determining an area where overlap between frames is performed, various determination methods such as a method of counting the number of events for each pixel and specifying an area where pixels in which multiple events are detected are concentrated, a method of dividing an image into multiple areas and counting the number of events for each area, and a method of determining an area where overlap is performed on the basis of a ratio between a positive event and a negative event detected may be used.

In the area R13 in the example illustrated in (c) to (d) of FIG. 11, since a negative event is detected after a positive event is detected, when the area R13 is reconstructed with the latest event, the area R13 is reconstructed with the negative event. In such a case, which of the positive event and the negative event is adopted in the overlap area may be set in advance or by the user according to the purpose of recognition processing or the like.

Next, an operation example of generating frame data according to the third example will be described with reference to a flowchart illustrated in FIG. 13. Note that, in this description, for the same operation as the operation illustrated in FIG. 4, redundant description will be omitted by citing this operation.

Figure 13:
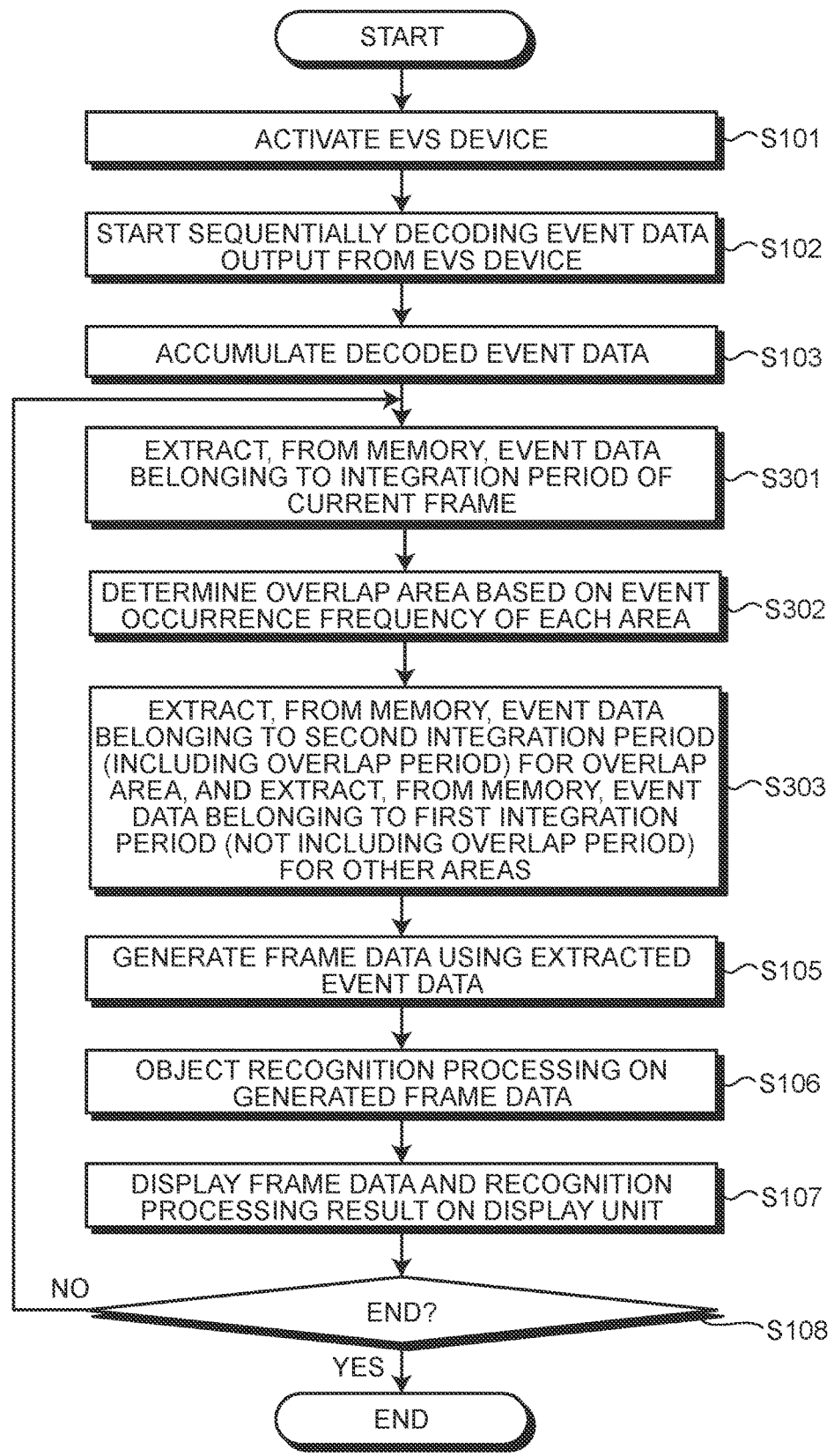
FIG. 13 is a flowchart illustrating a schematic operation example of the electronic apparatus according to the third example of the first embodiment.

As illustrated in FIG. 13, in this operation, first, as in Steps S101 to S103 of FIG. 4, the EVS device 100 is activated (Step S101), and when decoding of the event data input from the EVS device 100 is disclosed (Step S102), the decoded event data is sequentially accumulated in the memory 207 (Step S103).

Next, the event data processing unit 202 extracts, from the memory 207, event data belonging to the integration period (including the overlap period) of the current frame (Step S301), and determines the overlap area where overlap between frames is performed on the basis of the extracted event data (Step S302). Note that, as described previously, for determining the overlap area, various determination methods such as a method of counting the number of events for each pixel and specifying an area where pixels in which multiple events are detected are concentrated, a method of dividing an image into multiple areas and counting the number of events for each area, and a method of determining an area where overlap is performed on the basis of a ratio between a positive event and a negative event detected may be used. Note that, the number of overlap areas set for one frame data is not limited to one, and multiple overlap areas may be set. In this case, the overlap periods set for the respective overlap areas may have the same length, or may have different lengths according to, for example, the event occurrence frequency.

Next, the event data processing unit 202 extracts, from the memory 207, event data belonging to the second integration period including the overlap period for the overlap area, and extracts, from the memory 207, event data belonging to the first integration period not including the overlap period for the other areas (Step S303).

Thereafter, as in Steps S105 to S108 in FIG. 4, the object recognition processing is executed on the frame data generated based on the extracted event data, and the recognition processing result is displayed on the display device 300 together with the frame data, and thereafter it is determined whether or not to end this operation. In a case where it is determined not to end this operation, this operation returns to Step S301.

As described above, the amount of data processing in the generation of frame data can be reduced by narrowing the area in which the overlap period is provided on the basis of the event occurrence frequency, so that the time from the occurrence of the event to the display of the frame data and/or the processing result can be shortened.

1.8.4 Fourth Example (Overlap Period Variable for Each Area (Part 2))

Figure 14:
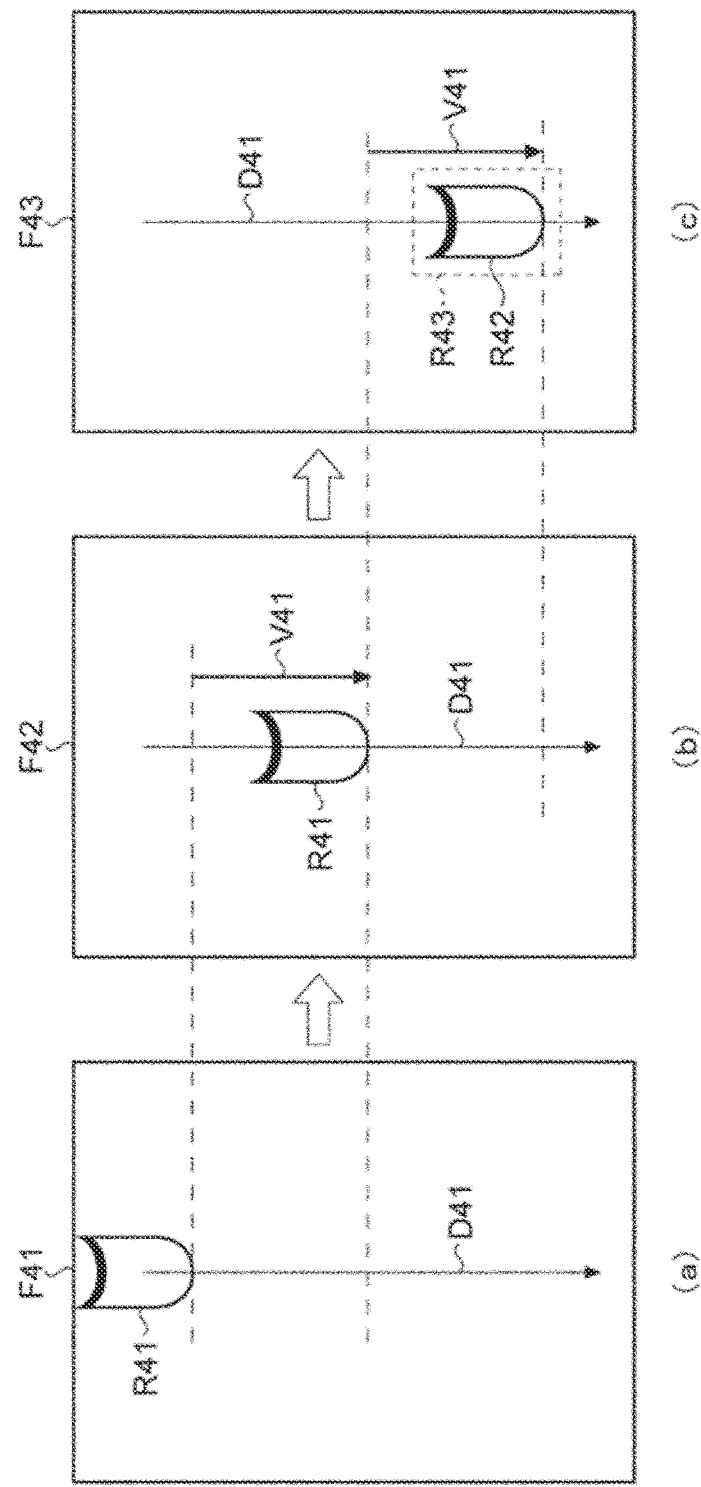
FIG. 14 is a schematic diagram illustrating an operation example of generating frame data according to a fourth example of the first embodiment.

FIG. 14 is a schematic diagram illustrating an operation example of generating frame data according to a fourth example of this embodiment. In the fourth example, an example in which the overlap period is variable for each area, and an example in which the overlap period for each area is set on the basis of the phase speed of an object or the like will be described.

In FIG. 14, (a) to (c) illustrate a first frame F41 to a third frame F43 continuous in time series.

As illustrated in (a) to (b) of FIG. 14, for an area R41 of a moving (including falling or the like) object, when a moving speed (acceleration, if necessary) V41 and a trajectory D41 of the object (or the area R41), in other words, the movement vector of the object (or the area R41) are known, it is possible to predict where the object area is located in the next frame.

Thus, in the fourth example, as illustrated in (c) of FIG. 14, the movement vector of the object (or the area R41) is calculated from one or more previous frames (the frames F41 and/or F42 in FIG. 14), and a position where an area R42 of the object is located in the next frame is predicted based on the calculated movement vector. Then, for the predicted area R42, the image is reconstructed by overlap between frames, and for other areas, the image is reconstructed without overlap between frames, thus generating frame data of the next frame. In this case, as described with reference to FIG. 12 in the third example, the first integration period is set for the area where no overlap between frames is performed, and the second integration period is set for the area R42 where overlap between frames is performed. Note that, the area where the image is reconstructed by overlap between frames may be an area R43 including the area R42 and its peripheral area.

Next, an operation example of generating frame data according to the fourth example will be described with reference to a flowchart illustrated in FIG. 15. Note that, in this description, for the same operation as the operation illustrated in FIG. 4 or FIG. 13, redundant description will be omitted by citing this operation.

Figure 15:
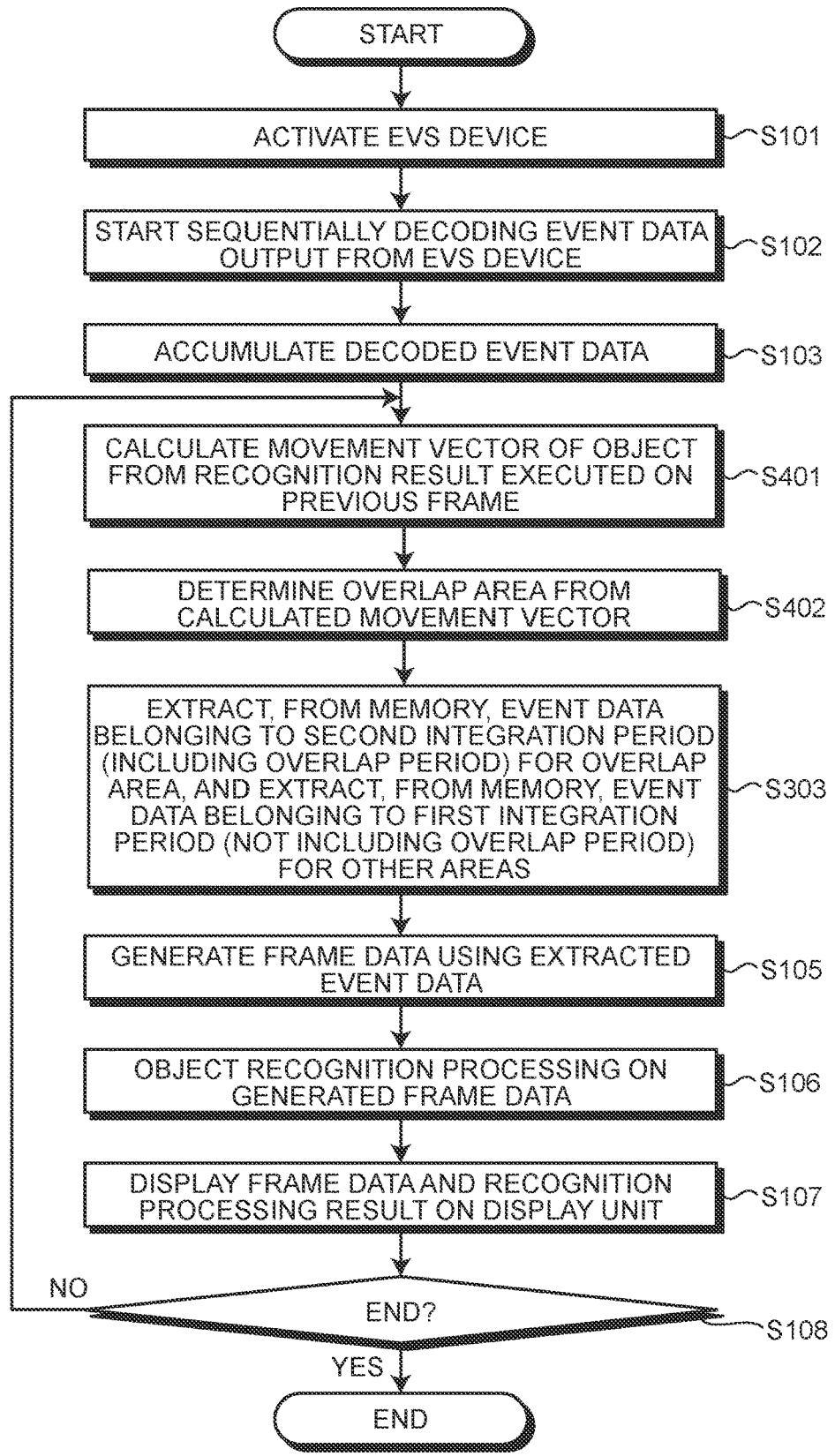
FIG. 15 is a flowchart illustrating a schematic operation example of the electronic apparatus according to the fourth example of the first embodiment.

As illustrated in FIG. 15, in this operation, first, as in Steps S101 to S103 of FIG. 4, the EVS device 100 is activated (Step S101), and when decoding of the event data input from the EVS device 100 is disclosed (Step 3102), the decoded event data is sequentially accumulated in the memory 207 (Step S103).

Next, the object recognition processing unit 204 calculates the movement vector of the object from a recognition processing result executed on one or more pieces of frame data before the current frame (Step S401). Note that, in a case where there are multiple objects in the frame, the object recognition processing unit 204 may calculate the movement vector of each object.

Next, the event data processing unit 202 specifies an area where each object exists in the current frame on the basis of the movement vector of the object calculated by the object recognition processing unit 204, and determines the specified area (and its peripheral area) as an overlap area (Step S402).

When the overlap area is determined in this manner, event data belonging to each of the integration periods of the overlap area and other areas is extracted from the memory 207 as in Step S303 in FIG. 13. Thereafter, the object recognition processing is executed on the frame data generated based on the extracted event data as in Steps S105 to S108 in FIG. 4, the recognition processing result is displayed on the display device 300 together with the frame data, and then it is determined whether or not to end this operation. In a case where it is determined not to end this operation, this operation returns to Step S401.

As described above, the amount of data processing in the generation of frame data can be reduced by predicting the area in which the overlap period is provided on the basis of the movement vector of the object, so that the time from the occurrence of the event to the display of the frame data and/or the processing result can be shortened as in the third example described above.

1.9 Application Example

Next, an application example of this embodiment will be described. Note that, in the following description, an application example of the method described above as the first example will be described, but the present invention is not limited to the first example, and any of the other second example to fourth example may be applied.

Figure 16:
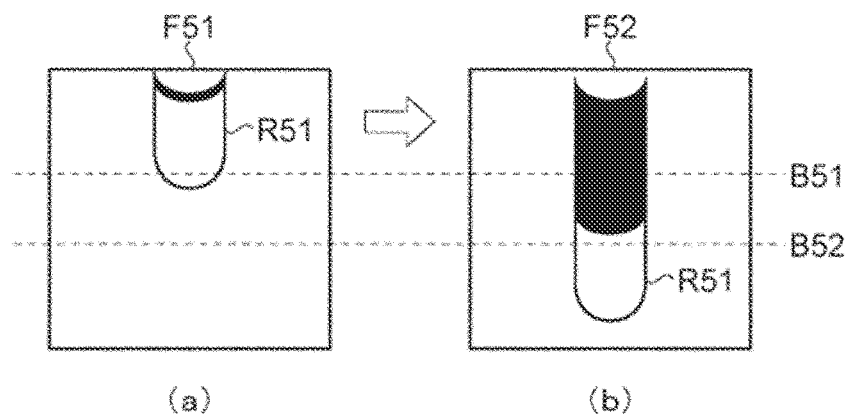
FIG. 16 is a diagram illustrating a method used in general object tracking.
Figure 17:
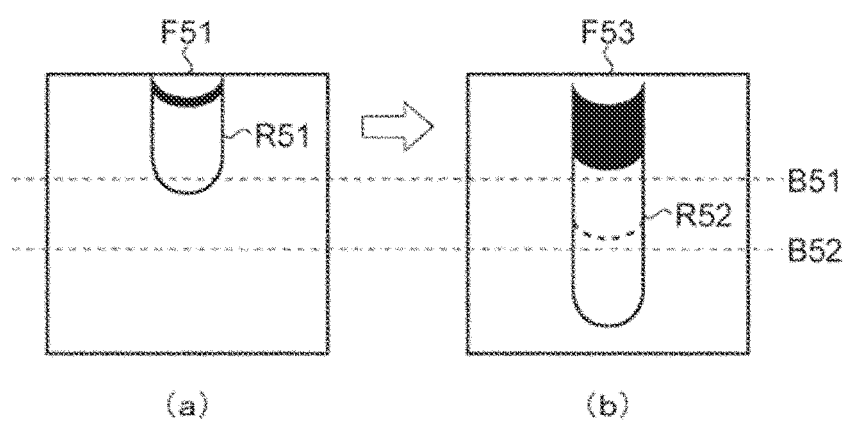
FIG. 17 is a diagram illustrating a case where this embodiment is applied to the method illustrated in FIG. 16.

1.9.1 Example of Application to Object Tracking for High-Speed Moving Object FIG. 16 is a diagram illustrating a method used in general object tracking. FIG. 17 is a diagram illustrating a case where this embodiment is applied to the method illustrated in FIG. 16.

As illustrated in (a) of FIG. 16, in general object tracking, two boundaries B51 and B52 are set for an area R51 of the object detected from the previous frame F51, and an area that straddles both of the two boundaries B51 and B52 in the next frame F52 is specified as the area R51 of the object to be tracked. However, when the moving speed of the object is faster than expected, as illustrated in (b) of FIG. 16, there is a possibility that the area R51 of the object passes through at least one of the two boundaries B51 and B5, and the object to be tracked is lost.

On the other hand, as illustrated in (a) to (b) of FIG. 17, by generating the next frame F53 of the previous frame F51 by applying the technique of overlapping images between frames according to this embodiment, the area R52 of the object can be expanded along the traveling direction of the object, so that it is possible to increase the possibility that the area R52 of the object straddles the two boundaries B51 and B52 in the next frame F53. As a result, it is possible to reduce the occurrence of a problem that an object to be tracked is lost.

Figure 18:
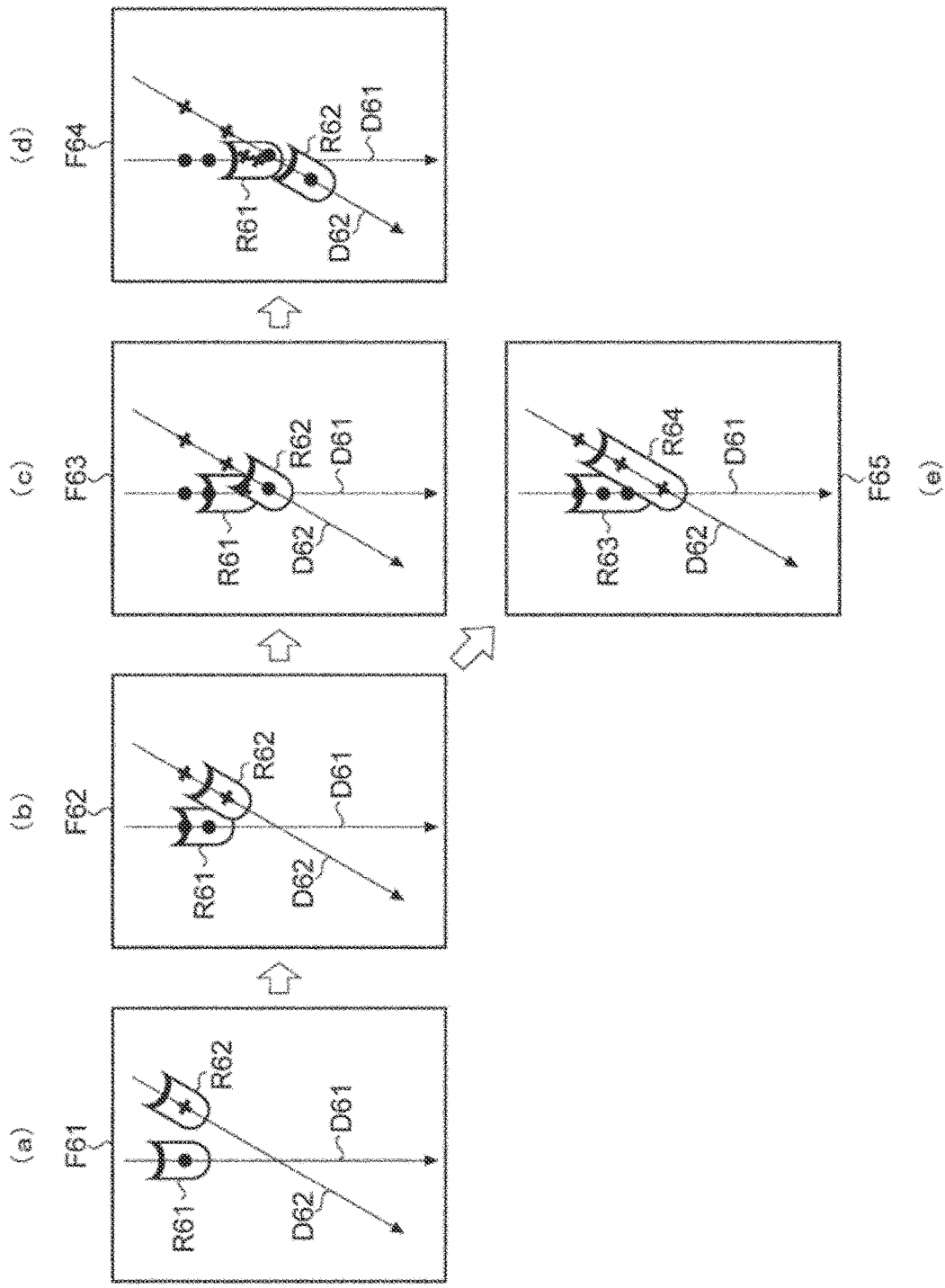
FIG. 18 is a diagram illustrating a case where the first embodiment is applied to a case where trajectories of multiple objects intersect.

1.9.2 Example of Application to Object Tracking in Case where Trajectories of Multiple Objects Intersect FIG. 18 is a diagram illustrating a case where this embodiment is applied to a case where trajectories of multiple objects intersect.

In FIG. 18, (a) to (d) illustrate results of object tracking on frames F61 to F64 in the case of not applying this embodiment, and (e) is a diagram illustrating a result of object tracking in a case where a frame F65 generated by applying this embodiment is used instead of the frame F63 illustrated in (d). Note that, in FIG. 18, an arrow D61 indicates a trajectory of an area R61, an arrow D62 indicates a trajectory of an area R62, a black circle indicates a reference position of the area R61, and a bold line '+' indicates a reference position of the area R62. Note that, the reference position is not limited to, for example, the center of gravity or the center of the area R61/R62, and may be a position determined by the shape or the like of each area.

As illustrated in (a) to (d) of FIG. 18, in a case where the trajectories of multiple objects intersect, for example, in the frame F63 (see (c)) in which the areas R61 and R62 of the respective objects overlap, there is a possibility that the two objects (corresponding to the areas R61 and R62) being tracked are mistaken. In this case, in frames after the frame F63 illustrated in (c), the object in the area R61 and the object in the area R62 are still mistaken, and the tracking of the object may fail.

On the other hand, as illustrated in (e) of FIG. 18, by generating the frame F65 in which at least the areas R61 and R62 of the objects overlap each other by applying the technique of overlapping images between frames according to this embodiment, the areas R61 and R62 of the respective objects can be expanded along the traveling directions of the objects. Therefore, it is possible to reduce the possibility of mistaking the object in the area R61 and the object in the area R62 in the recognition processing on the next frame F65. This makes it possible to reduce the possibility of failing to track the object.

1.9.3 Example of Application to Object Tracking Using Mean Shift Method

Figure 19:
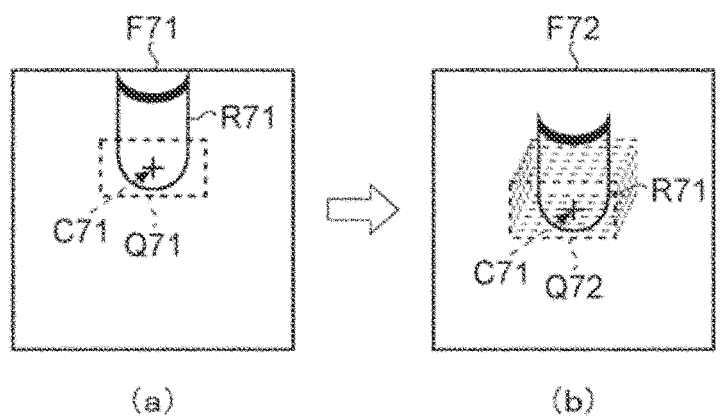
FIG. 19 is a diagram illustrating object tracking using the Mean Shift method.
Figure 20:
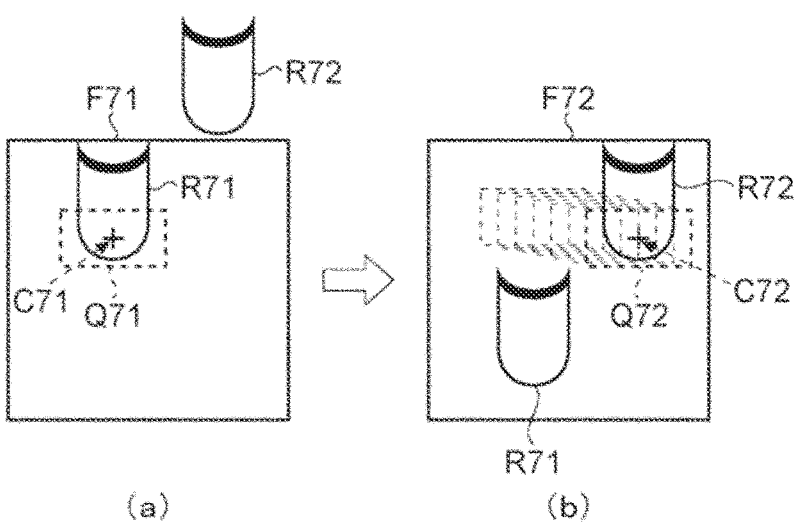
FIG. 20 is a diagram illustrating a problem that may occur in object tracking using the Mean Shift method.
Figure 21:
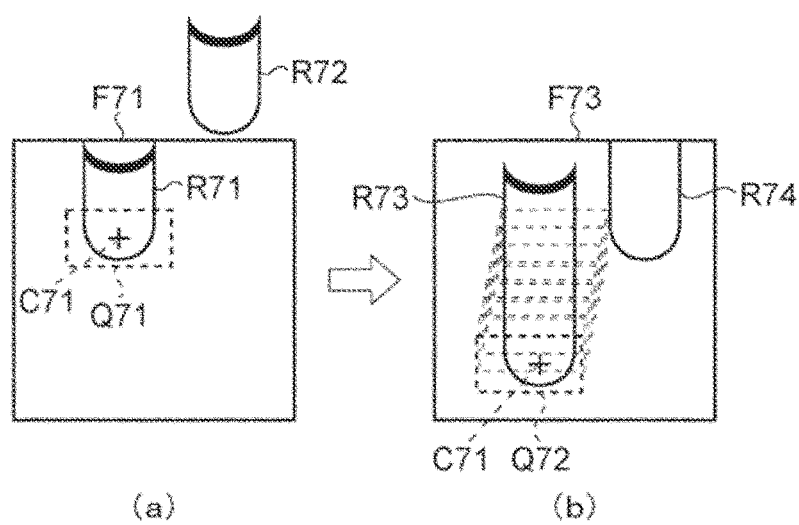
FIG. 21 is a diagram illustrating a case where the first embodiment is applied to object tracking using the Mean Shift method.

FIG. 19 is a diagram illustrating object tracking using the Mean Shift method. FIG. 20 is a diagram illustrating a problem that may occur in object tracking using the Mean Shift method. FIG. 21 is a diagram illustrating a case where this embodiment is applied to object tracking using the Mean Shift method.

As illustrated in (a) to (b) of FIG. 19, in the object tracking using the Mean Shift method, the possibility (the amount of feature) of the pixel of the object (corresponding to an area R71) tracked in the previous frame F71 is mapped, and the center of gravity C71 of this area Q71 is searched for in the next frame F72, thus tracking the object moving between frames.

In such object tracking using the Mean Shift method, as illustrated in FIGS. 20(a) to (b), in the next frame F72, when an area R72 of another object appears in the vicinity of the area Q71 to which the amount of feature is mapped in the previous frame F71, and the amount of feature is mapped to an area Q72, there is a possibility that the area Q71 is determined to have moved to the area Q72 as a result of searching by shifting the area Q71, and the object in the area R71 and the object in the area R72 are mistaken.

On the other hand, as illustrated in (a) to (b) of FIG. 21, by generating the next frame F73 of the previous frame F71 by applying the technique of overlapping images between frames according to this embodiment, the shift direction of the area Q71 can be set to a direction along the area R73 spread in the traveling direction of the object, so that it is possible to reduce the possibility of mistaking the object in the next frame F73. This makes it possible to reduce the possibility of failing to track the object.

1.10 Summary

As described above, according to this embodiment, since the image of the moving object can be spread along the movement trajectory by overlapping images between frames, it is possible to suppress the occurrence of a problem such as loss of the object in the object tracking, for example. This makes it possible to suppress a decrease in the accuracy of inspection, recognition, and the like of an object.

2. Second Embodiment

Next, an information processing apparatus and an electronic apparatus according to a second embodiment will be described in detail with reference to the drawings. In this embodiment, a case of combining the EVS device 100 and another type of sensor will be described with an example.

Note that, in the following description, for the same configuration as the configuration in the above embodiment, redundant description will be omitted by citing this configuration.

2.1 System Configuration Example

Figure 22:
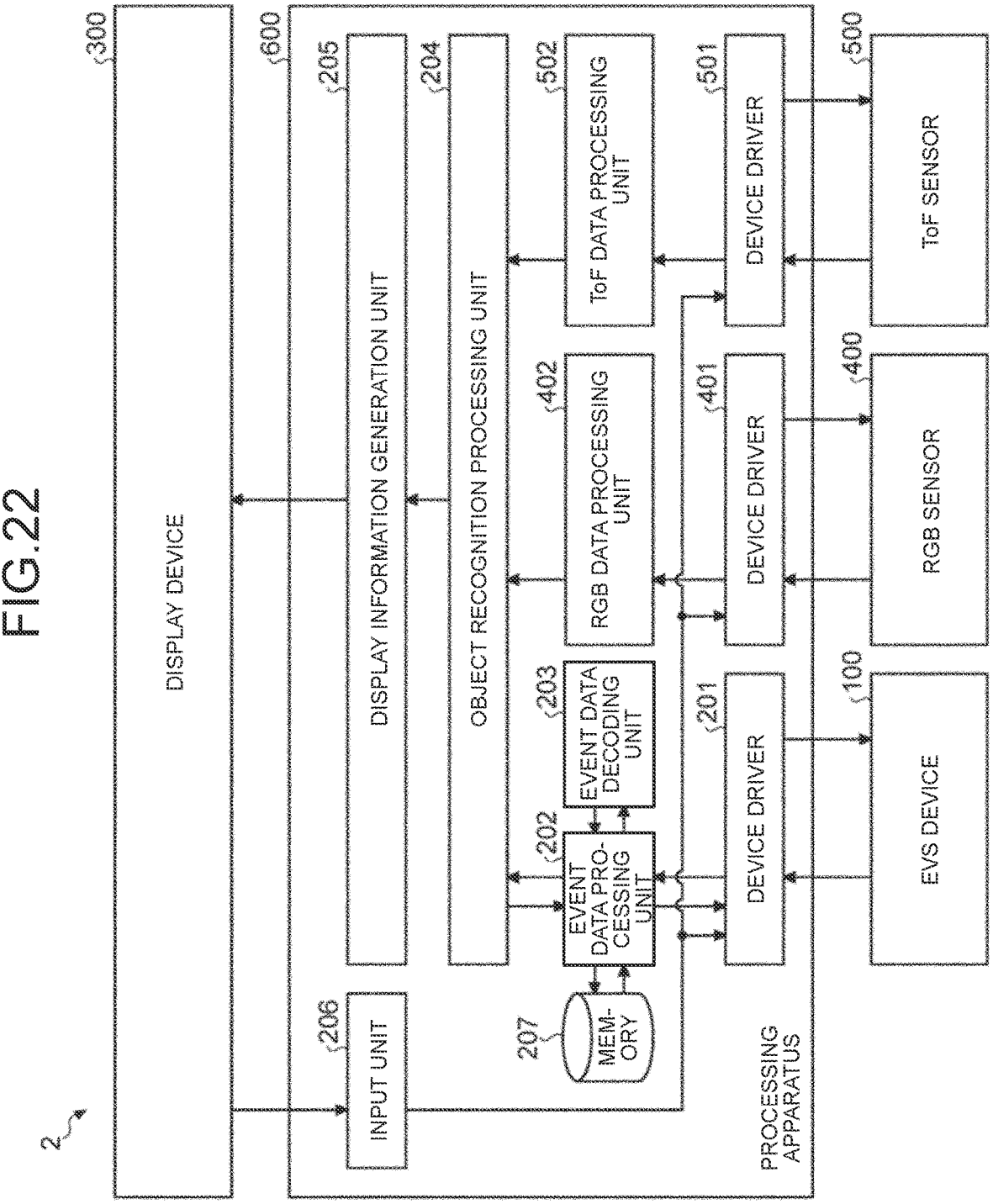
FIG. 22 is a schematic diagram illustrating a schematic configuration example of an electronic apparatus equipped with a solid-state imaging device according to a second embodiment.

FIG. 22 is a schematic diagram illustrating a schematic configuration example of an electronic apparatus equipped with a solid-state imaging device according to the second embodiment. As illustrated in FIG. 22, an electronic apparatus 2 according to this embodiment has a configuration similar to the electronic apparatus 1 described with reference to FIG. 1 in the first embodiment, in which the processing apparatus 200 is replaced with a processing apparatus 600 and which includes an RGB sensor 400 and a time-of-flight (ToF) sensor 500 in addition to the EVS device 100.

The RGB sensor 400 may be, for example, an image sensor that generates color images of three RGB primary colors. However, the image sensor is not limited to this, and may be various image sensors such as an image sensor that generates a monochrome image and an image sensor that generates a monochrome image or a color image including a specific wavelength component such as infrared light. Note that, in the following description, for the sake of simplicity, the image data output from the RGB sensor 400 is also referred to as RGB data.

The ToF sensor 500 may be, for example, a sensor that includes a light source and a light receiving unit (not illustrated) and outputs depth information indicating a distance to an object by detecting light emitted from the light source and reflected by the object. However, instead of the ToF sensor 500, various sensors such as an ultrasonic sensor, a millimeter wave radar, a LiDAR, and a proximity sensor may be used. Note that, in the following description, for the sake of simplicity, the depth information output from the ToF sensor 500 is also referred to as ToF data.

Note that, in FIG. 22, the EVS device 100, the RGB sensor 400, and the ToF sensor 500 are illustrated as separate configurations, but the present invention is not limited to this, and at least two of the EVS device 100, the RGB sensor 400, and the ToF sensor 500 may be built in the same chip.

2.2 Schematic Configuration Example of Processing Apparatus

The processing apparatus 600 has, for example, a configuration similar to the configuration of the processing apparatus 200 described with reference to FIG. 1 in the first embodiment, and further includes a device driver 401, an RGB data processing unit 402, a device driver 501, and a ToF data processing unit 502.

(Device Driver 401)

The device driver 401 is a driver that drives the RGB sensor 400, and drives the RGB sensor 400 on the basis of held parameters. Further, the device driver 401 inputs RGB data output from the RGB sensor 400 to the RGB data processing unit 402.

(RGB Data Processing Unit 402)

The RGB data processing unit 402 executes predetermined signal processing such as white balance adjustment and noise removal on the RGB data input from the device driver 401. The RGB data subjected to the signal processing is input to the object recognition processing unit 204, for example.

(Device Driver 501)

The device driver 501 is a driver that drives the ToF sensor 500, and drives the ToF sensor 500 on the basis of held parameters. In addition, the device driver 501 inputs ToF data output from the ToF sensor 500 to the ToF data processing unit 502.

(ToF Data Processing Unit 502)

The ToF data processing unit 502 generates a depth image two-dimensionally representing the distance to an object on the basis of the ToF data input from the device driver 501. The generated depth image is input to, for example, the object recognition processing unit 204.

2.3 Schematic Operation Example

Next, a schematic operation of the electronic apparatus according to this embodiment will be described below with some examples. Note that, although this embodiment exemplifies a case where the electronic apparatus operates as the image recognition system, the present invention is not limited to this, and the technique according to this embodiment is applicable to a system that executes some processing on the basis of event data input from the EVS device 100. Note that, in the following description, for the same operation as the operation described above with reference to FIG. 4, 10, 13, or 15, redundant description will be omitted by citing this operation.

2.3.1 First Operation Example

Figure 23:
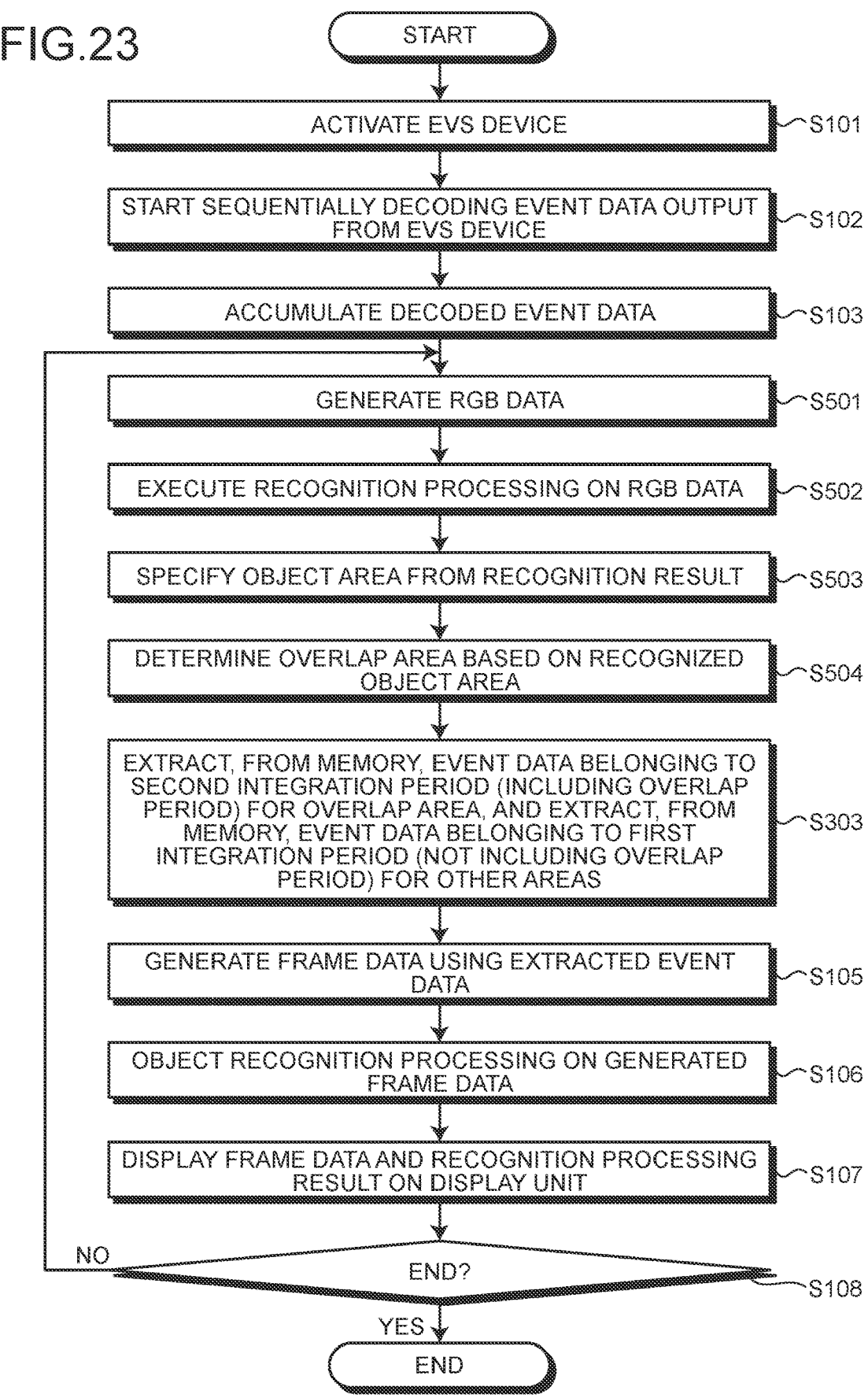
FIG. 23 is a flowchart illustrating a schematic operation example of the electronic apparatus according to a first operation example of the second embodiment.

In a first operation example, an operation example in the case of combining the EVS device 100 and the RGB sensor 400 will be described. FIG. 23 is a flowchart illustrating a schematic operation example of the electronic apparatus according to the first operation example of this embodiment.

As illustrated in FIG. 23, in this operation, first, as in Steps S101 to S103 of FIG. 4, the EVS device 100 is activated (Step S101), and when decoding of the event data input from the EVS device 100 is disclosed (Step S102), the decoded event data is sequentially accumulated in the memory 207 (Step S103).

Next, the device driver 401 drives the RGB sensor 400 to generate RGB data (Step S501). The generated RGB data is subjected to predetermined processing in the RGB data processing unit 402, and then input to the object recognition processing unit 204. On the other hand, the object recognition processing unit 204 executes object recognition processing on the input RGB data (Step S502). The recognition result obtained as a result is input to the event data processing unit 202.

The event data processing unit 202 specifies an object area on the basis of the recognition result input from the object recognition processing unit 204 (Step 3503), and determines an overlap area on the basis of the specified object area (Step S504).

When the overlap area is determined in this manner, event data belonging to each of the integration periods of the overlap area and other areas is extracted from the memory 207 as in Step S303 in FIG. 13. Thereafter, the object recognition processing is executed on the frame data generated based on the extracted event data as in Steps S105 to S108 in FIG. 4, the recognition processing result is displayed on the display device 300 together with the frame data, and then it is determined whether or not to end this operation. In a case where it is determined not to end this operation, this operation returns to Step 3501.

2.3.2 Second Operation Example

Figure 24:
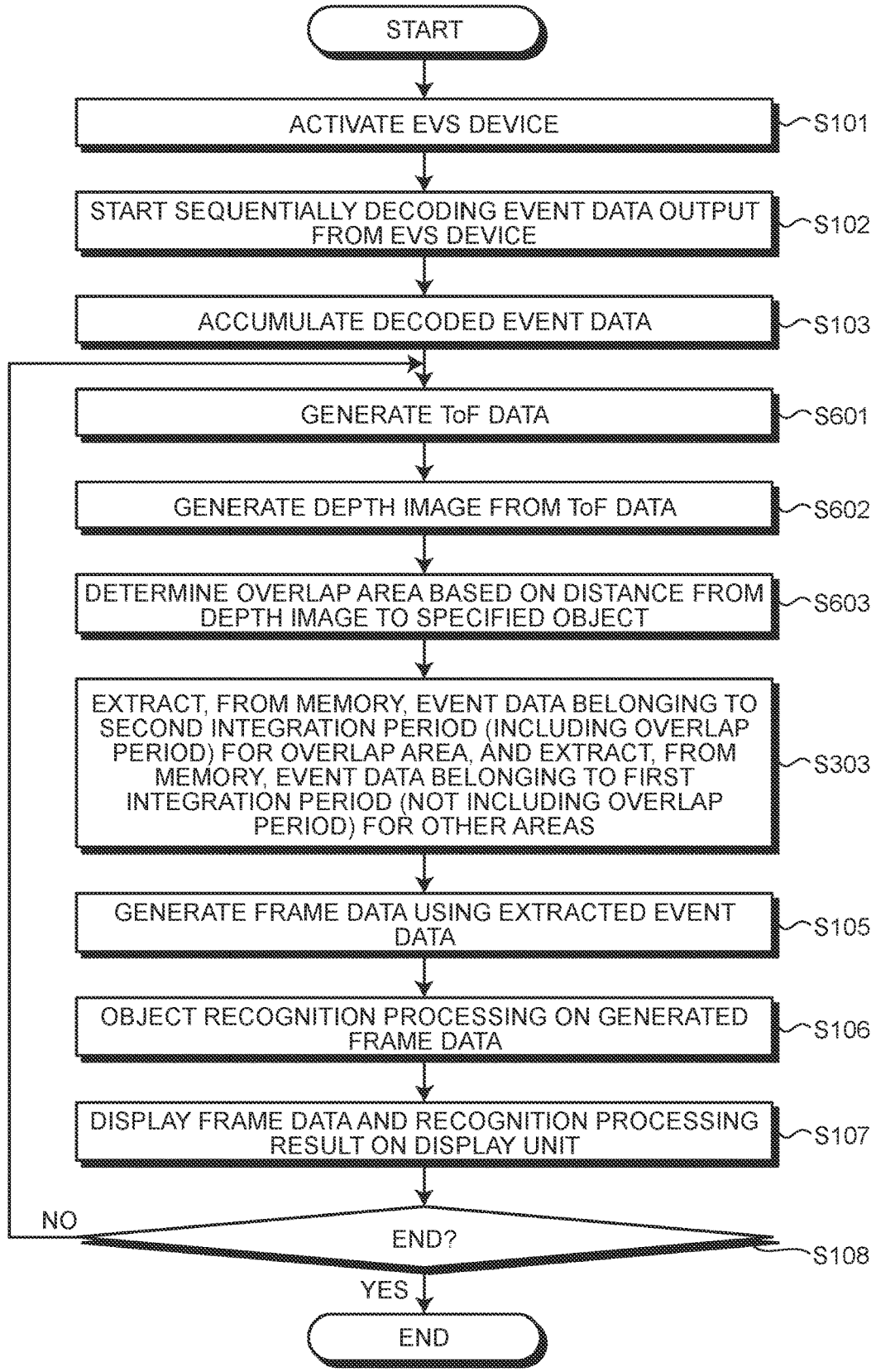
FIG. 24 is a flowchart illustrating a schematic operation example of the electronic apparatus according to a second operation example of the second embodiment.

In a second operation example, an operation example in the case of combining the EVS device 100 and the ToF sensor 500 will be described. FIG. 24 is a flowchart illustrating a schematic operation example of the electronic apparatus according to the second operation example of this embodiment.

As illustrated in FIG. 24, in this operation, first, as in Steps S101 to S103 of FIG. 4, the EVS device 100 is activated (Step S101), and when decoding of the event data input from the EVS device 100 is disclosed (Step 3102), the decoded event data is sequentially accumulated in the memory 207 (Step S103).

Next, the device driver 501 drives the ToF sensor 500 to generate ToF data (Step S601). The generated ToF data is input to the ToF data processing unit 502 via the device driver 501. The ToF data processing unit 502 generates a depth image which is a two-dimensional distribution of distance information from the input ToF data (Step S602). The generated depth image is input to the event data processing unit 202 directly from the ToF data processing unit 502 or via the object recognition processing unit 204.

The event data processing unit 202 determines an overlap area on the basis of the distance from the input depth image to the specified object (Step S603).

When the overlap area is determined in this manner, event data belonging to each of the integration periods of the overlap area and other areas is extracted from the memory 207 as in Step S303 in FIG. 13. Thereafter, the object recognition processing is executed on the frame data generated based on the extracted event data as in Steps S105 to S108 in FIG. 4, the recognition processing result is displayed on the display device 300 together with the frame data, and then it is determined whether or not to end this operation. In a case where it is determined not to end this operation, this operation returns to Step S601.

Note that, in this description, the case of combining the EVS device 100 with one of the RGB sensor 400 and the ToF sensor 500 has been exemplified, but the present invention is not limited to this, and for example, both the RGB sensor 400 and the ToF sensor 500 may be combined. In that case, for example, the overlap area may be determined by specifying an object area from the RGB data, specifying the distance to the object from the depth image for the specified area, and determining the overlap area on the basis of the object area and the distance to the object.

In addition, the size of the object area specified on the basis of the RGB data, the distance to the object specified on the basis of the ToF data, and the like may be used not only for determination of the overlap area but also for adjustment of the overlap period, for example.

Further, in order to specify the object area based on the RGB data, color data of some colors may be used instead of color data of all colors. For example, blue color data may be used to specify a droplet area at the time of tracking droplets.

2.4 Summary

As described above, in this embodiment, different types of sensors such as the RGB sensor 400 and the ToF sensor 500 of the EVS device 100 are combined, and the overlap area is determined on the basis of the information obtained by these sensors. Thus, a more accurate area can be set as the overlap area.

Note that, other configurations, operations, and effects may be the same as those of the first embodiment described above, and thus their detailed description will be omitted here.

3. Hardware Configuration

Figure 25:
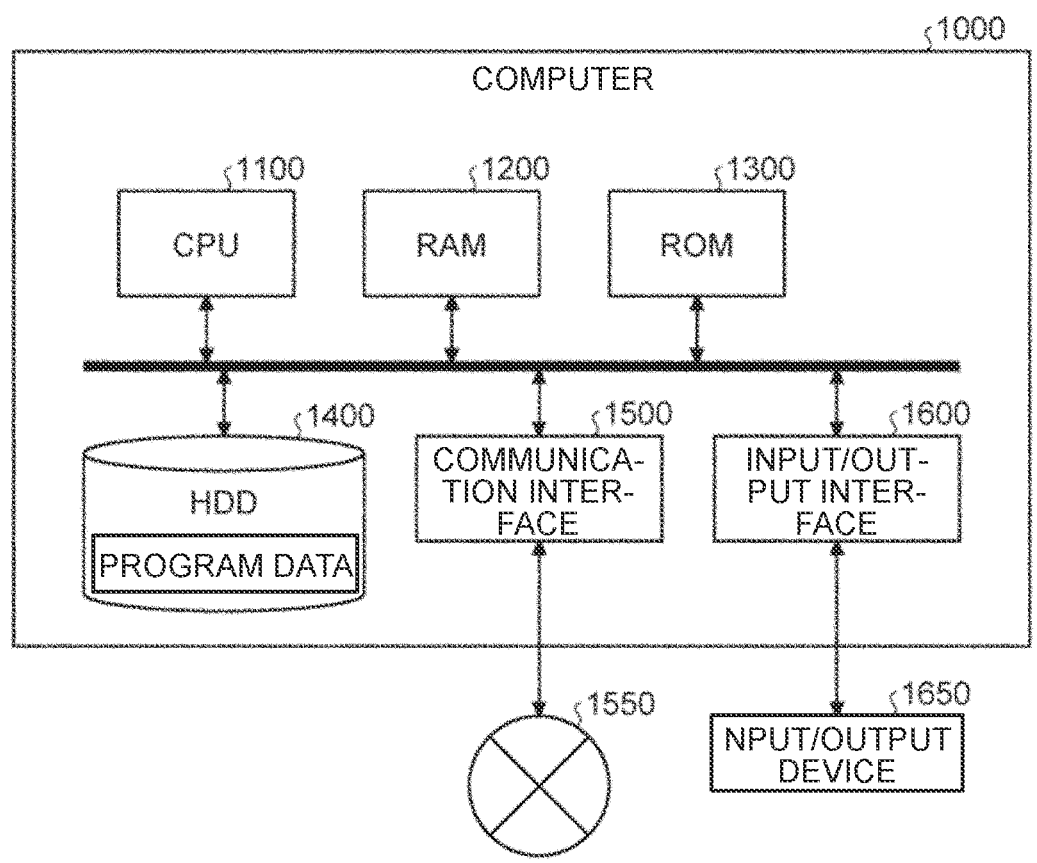
FIG. 25 is a hardware configuration diagram illustrating an example of a computer that implements functions of the information processing apparatus according to the present disclosure.

The processing apparatus 200/600 according to the embodiments, their modifications, and the application examples described above can be implemented by, for example, a computer 1000 having a configuration as illustrated in FIG. 25. FIG. 25 is a hardware configuration diagram illustrating an example of the computer 1000 that implements the functions of the processing apparatus 200/600. The computer 1000 includes a CPU 1100, a RAM 1200, a read only memory (ROM) 1300, a hard disk drive (HDD) 1400, a communication interface 1500, and an input/output interface 1600. These units of the computer 1000 are connected to each other by a bus 1050.

The CPU 1100 operates on the basis of programs stored in the ROM 1300 or the HDD 1400, and controls each unit. For example, the CPU 1100 develops programs stored in the ROM 1300 or the HDD 1400 on the RAM 1200, and executes processing corresponding to the various programs.

The ROM 1300 stores a boot program such as a basic input output system (BIOS) executed by the CPU 1100 when the computer 1000 is activated, a program dependent on hardware of the computer 1000, and the like.

The HDD 1400 is a computer-readable recording medium that non-transiently records a program executed by the CPU 1100, data used by the program, and the like. Specifically, the HDD 1400 is a recording medium that records a projection control program according to this disclosure as an example of program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 has a configuration including the I/F unit 18 described above, and is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Further, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the processing apparatus 200/600 according to the above embodiments, the CPU 1100 of the computer 1000 executes a program loaded on the RAM 1200 to implement at least one function of the event data processing unit 202, the RGB data processing unit 402, the ToF data processing unit 502, the object recognition processing unit 204, and the display information generation unit 205. In addition, the HDD 1400 stores a program and the like according to this disclosure. Note that, the CPU 1100 reads the program data 1450 from the HDD 1400 and executes the program data, but as another example, these programs may be acquired from another device via the external network 1550.

Although the embodiments of this disclosure have been described above, the technical scope of this disclosure is not limited to the above-described embodiments as it is, and various modifications can be made without departing from the gist of this disclosure. In addition, constituents of different embodiments and modifications may be appropriately combined.

Further, the effects of the embodiments described in this specification are merely examples and are not limited, and the embodiments may have other effects.

Note that, the present technique can also have the following configuration.

(1)
An information processing apparatus including
a processing unit that generates image data on the basis of event data output from a first sensor including a pixel array unit in which a plurality of pixels that each detect a luminance change of incident light and output event data are arranged in a two-dimensional lattice pattern, wherein
the processing unit generates first image data of a current frame by using event data detected during an integration period including an overlap period that overlaps with at least a part of a frame period of a previous frame.

(2)
The information processing apparatus according to (1), wherein
the integration period is longer than the frame period.

(3)
The information processing apparatus according to (1) or (2), wherein
the processing unit adjusts the length of the overlap period on the basis of the number of events detected during the frame period of the previous frame.

(4)
The information processing apparatus according to any one of (1) to (3), wherein
the processing unit sets the overlap period having a different length for each of areas of the first image data on the basis of an event detected during the integration period of the current frame.

(5)
The information processing apparatus according to (4), wherein
the processing unit sets the overlap period having a different length for each of the areas on the basis of the number of events for each of the areas detected during the integration period of the current frame.

(6)
The information processing apparatus according to (4), wherein
the processing unit sets the overlap period having a different length for each of the areas on the basis of the number of events for each of pixels detected during the integration period of the current frame.

(7)
The information processing apparatus according to (4), wherein
the processing unit sets the overlap period having a different length for each of the areas on the basis of a ratio of polarities of events for each of the areas detected during the integration period of the current frame.

(8)
The information processing apparatus according to (1) or (2), wherein
the processing unit sets the overlap period in an area on the first image data, the area being specified based on a movement vector of an object specified from one or more frames before the current frame.

(9)
The information processing apparatus according to (1) or (2), wherein
the processing unit sets the overlap period in an area on the first image data corresponding to an object area specified by recognition processing on second image data output from a second sensor that generates image data.

(10)
The information processing apparatus according to (1) or (2), wherein
the processing unit sets the overlap period having a different length for each of areas of the first image data based on distance information output from a third sensor that measures a distance to an object.

(11)
The information processing apparatus according to any one of (1) to (10), further including
a recognition processing unit that executes recognition processing on the first image data generated by the processing unit.

(12)
The information processing apparatus according to (11), wherein
the recognition processing is object tracking.

(13)
The information processing apparatus according to (11) or (12), wherein
the recognition processing is processing by an algorithm using pattern matching or a Mean Shift method.

(14)
An electronic apparatus including:
a first sensor that includes a pixel array unit in which a plurality of pixels that each detect a luminance change of incident light and output event data are arranged in a two-dimensional lattice pattern; and
a processing unit that generates image data on the basis of event data output from the first sensor, wherein
the processing unit generates first image data of a current frame by using event data detected during an integration period including an overlap period that overlaps with at least a part of a frame period of a previous frame.

(15)
The electronic apparatus according to (14), further including
a second sensor that generates image data, wherein
the processing unit sets the overlap period in an area on the first image data corresponding to an object area specified by recognition processing on second image data output from the second sensor.

(16)
The electronic apparatus according to (14), further including
a third sensor that measures a distance to an object, wherein
the processing unit sets the overlap period having a different length for each of areas of the first image data based on distance information output from the third sensor.

REFERENCE SIGNS LIST 1, 2 ELECTRONIC APPARATUS
20 EVENT PIXEL
100 EVS DEVICE
101 PIXEL ARRAY UNIT
103 EVENT SIGNAL PROCESSING CIRCUIT
104A X ARBITER
104B Y ARBITER
105 SYSTEM CONTROL CIRCUIT
109 OUTPUT I/F
200, 600 PROCESSING APPARATUS
201, 401, 501 DEVICE DRIVER
202 EVENT DATA PROCESSING UNIT
203 EVENT DATA DECODING UNIT
204 OBJECT RECOGNITION PROCESSING UNIT
205 DISPLAY INFORMATION GENERATION UNIT
206 INPUT UNIT
207 MEMORY
300 DISPLAY DEVICE
400 RGB SENSOR
402 RGB DATA PROCESSING UNIT
500 ToF SENSOR
502 ToF DATA PROCESSING UNIT

The invention claimed is:

1. An information processing apparatus comprising:
a memory storing a program, and
a processor configured to execute the program to perform operations comprising:
generating image data on the basis of event data output from a first sensor including a pixel array unit in which a plurality of pixels that each detect a luminance change of incident light and output event data are arranged in a two-dimensional lattice pattern;
generating first image data of a current frame by using event data detected during an integration period including an overlap period that overlaps with at least a part of a frame period of a previous frame;
setting the overlap period to have a different length for each of areas of the first image data on the basis of a number of events for respective pixels detected during the integration period of the current frame.

2. The information processing apparatus according to claim 1, wherein the integration period is longer than the frame period.

3. The information processing apparatus according to claim 1, wherein the operations further comprise:
executing recognition processing on the first image data.

4. The information processing apparatus according to claim 3, wherein the recognition processing is object tracking.

5. The information processing apparatus according to claim 3, wherein the recognition processing is processing by an algorithm using pattern matching or a Mean Shift method.

6. An electronic apparatus comprising the information processing apparatus according to claim 1.

7. An information processing apparatus comprising:
a memory storing a program, and
a processor configured to execute the program to perform operations comprising:
generating image data on the basis of event data output from a first sensor including a pixel array unit in which a plurality of pixels that each detect a luminance change of incident light and output event data are arranged in a two-dimensional lattice pattern;
generating first image data of a current frame by using event data detected during an integration period including an overlap period that overlaps with at least a part of a frame period of a previous frame; and
setting the overlap period to have a different length for each of areas of the first image data detected during the integration period of the current frame on the basis of a ratio of polarities of events for each of the areas.

8. An electronic apparatus comprising the information processing apparatus according to claim 7.

9. An information processing apparatus comprising:
a memory storing a program, and
a processor configured to execute the program to perform operations comprising:
generating image data on the basis of event data output from a first sensor including a pixel array unit in which a plurality of pixels that each detect a luminance change of incident light and output event data are arranged in a two-dimensional lattice pattern;
generating first image data of a current frame by using event data detected during an integration period including an overlap period that overlaps with at least a part of a frame period of a previous frame; and
setting the overlap period in an area on the first image data, the area being specified based on a movement vector of an object specified from one or more frames before the current frame.

10. An electronic apparatus comprising the information processing apparatus according to claim 9.

11. A non-transitory computer readable medium storing a program, the program being executable by a processor to perform operations comprising:
generating image data on the basis of event data output from a first sensor including a pixel array unit in which a plurality of pixels that each detect a luminance change of incident light and output event data are arranged in a two-dimensional lattice pattern;
generating first image data of a current frame by using event data detected during an integration period including an overlap period that overlaps with at least a part of a frame period of a previous frame;
setting the overlap period to have a different length for each of areas of the first image data on the basis of a number of events for respective pixels detected during the integration period of the current frame.

12. The non-transitory computer readable medium according to claim 11, wherein the integration period is longer than the frame period.

13. The non-transitory computer readable medium according to claim 11, wherein the operations further comprise:
executing recognition processing on the first image data.

14. The non-transitory computer readable medium according to claim 13, wherein the recognition processing is object tracking.

15. The non-transitory computer readable medium according to claim 13, wherein the recognition processing is processing by an algorithm using pattern matching or a Mean Shift method.

16. A non-transitory computer readable medium storing a program, the program being executable by a processor to perform operations comprising:
generating image data on the basis of event data output from a first sensor including a pixel array unit in which a plurality of pixels that each detect a luminance change of incident light and output event data are arranged in a two-dimensional lattice pattern;

generating first image data of a current frame by using event data detected during an integration period including an overlap period that overlaps with at least a part of a frame period of a previous frame; and setting the overlap period to have a different length for each of areas of the first image data detected during the integration period of the current frame on the basis of a ratio of polarities of events for each of the areas.

17. A non-transitory computer readable medium storing a program, the program being executable by a processor to perform operations comprising:

generating image data on the basis of event data output from a first sensor including a pixel array unit in which a plurality of pixels that each detect a luminance change of incident light and output event data are arranged in a two-dimensional lattice pattern;

generating first image data of a current frame by using event data detected during an integration period including an overlap period that overlaps with at least a part of a frame period of a previous frame; and settings the overlap period in an area on the first image data, the area being specified based on a movement vector of an object specified from one or more frames before the current frame.

* * * * *